US011751127B2

(12) United States Patent
Tabatabaie et al.

(10) Patent No.: US 11,751,127 B2
(45) Date of Patent: Sep. 5, 2023

(54) INDOOR LOCALIZATION BASED ON PREVIOUS ACTIVITIES

(71) Applicants: Mahan Tabatabaie, Tehran (IR); Ali Mohades Khorasani, Tehran (IR); Mohammad Ebrahim Shiri, Tehran (IR)

(72) Inventors: Mahan Tabatabaie, Tehran (IR); Ali Mohades Khorasani, Tehran (IR); Mohammad Ebrahim Shiri, Tehran (IR)

( * ) Notice: Subject to any disclaimer, the term of this patent is extended or adjusted under 35 U.S.C. 154(b) by 150 days.

(21) Appl. No.: 17/474,956

(22) Filed: Sep. 14, 2021

(65) Prior Publication Data

US 2021/0410055 A1 Dec. 30, 2021

Related U.S. Application Data

(60) Provisional application No. 63/077,708, filed on Sep. 14, 2020.

(51) Int. Cl.
| | |
|---|---|
| *H04W 64/00* | (2009.01) |
| *H04W 48/16* | (2009.01) |
| *H04W 88/10* | (2009.01) |
| *H04L 41/16* | (2022.01) |
| *H04B 17/318* | (2015.01) |
| *H04W 88/12* | (2009.01) |

(52) U.S. Cl.
CPC .......... *H04W 48/16* (2013.01); *H04B 17/318* (2015.01); *H04L 41/16* (2013.01); *H04W 64/003* (2013.01); *H04W 88/10* (2013.01); *H04W 88/12* (2013.01)

(58) Field of Classification Search
None
See application file for complete search history.

(56) References Cited

U.S. PATENT DOCUMENTS

| | | | | |
|---|---|---|---|---|
| 2009/0247185 | A1* | 10/2009 | Gilad | H04W 64/00 455/456.1 |
| 2020/0304953 | A1* | 9/2020 | Georgy | H04W 4/026 |
| 2021/0274496 | A1* | 9/2021 | Chen | G01S 7/4808 |

OTHER PUBLICATIONS

Jin Ren, Yunan Wang, Changliu Niu, Wei Song, and Songyang Huang, A Novel Clustering Algorithm for Wi-Fi Indoor Positioning, IEEE Access, Sep. 11, 2019. (Year: 2019).*

(Continued)

*Primary Examiner* — German Viana Di Prisco
(74) *Attorney, Agent, or Firm* — Bajwa IP Law Firm; Haris Zaheer Bajwa

(57) ABSTRACT

A method for indoor localization based on previous activities. The method includes acquiring a target observation from a target user, adding the target observation to a target observations list of a plurality of observations lists, obtaining a target cluster for the target user, verifying that the target cluster satisfies a localization condition, replacing the target cluster with a substitute cluster responsive to the target cluster not satisfying the localization condition, obtaining an estimated location of the target user based on the target cluster responsive to the target cluster satisfying the localization condition, obtaining the estimated location based on the plurality of observations lists responsive to the substitute cluster not satisfying the localization condition, and storing the estimated location in a database. The target observation is acquired utilizing an access point.

20 Claims, 14 Drawing Sheets

(56) References Cited

OTHER PUBLICATIONS

Weixing Xue , Xianghong Hua, Qingquan Li, Kegen Yu1, , and Weining Qiu, Improved Neighboring Reference Points Selection Method for Wi-Fi Based Indoor Localization, IEEE Sensor Letters, vol. 2, No. 2, Jun. 2018 (Year: 2018).*

* cited by examiner

300

| After Scan₁ | $AP_1 = -57$ | $AP_2 = -42$ | | ← 302
| After Scan₂ | $AP_1 = -52$ | $AP_2 = -45$ | $AP_3 = -64$ | ← 304
| After Scan₃ | $AP_1 = -55$ | $AP_2 = -45$ | $AP_3 = -67$ | ← 306

FIG. 3

INDOOR LOCALIZATION BASED ON PREVIOUS ACTIVITIES

CROSS-REFERENCE TO RELATED APPLICATION

This application claims the benefit of priority from pending U.S. Provisional Patent Application Ser. No. 63/077,708, filed on Sep. 14, 2020, and entitled "WI-FI FINGERPRINT-BASED INDOOR LOCALIZATION BASED ON PREVIOUS ACTIVITIES," which is incorporated herein by reference in its entirety.

TECHNICAL FIELD

The present disclosure generally relates to indoor localization, and particularly, to Wi-Fi fingerprinting.

BACKGROUND

Prevalence of Wi-Fi access points (APs) in recent years has allowed researchers to develop various methods to solve indoor localization problems based on Wi-Fi signals. Among various methods, Wi-Fi fingerprinting has been a promising approach due to its simplicity of deployment. A fingerprinting approach typically consists of an offline (training) phase and an online (positioning) phase. In an offline phase, an origin may be selected in a building, and a coordination system may be created relative to the origin. Therefore, every single point in the building may be defined with a two-dimensional (x,y) point. Each fingerprint may include a vector of received signal strength (RSS) values from different APs available at each point. A set of all fingerprints collected for a building may be referred to as radio map or offline data. In an online phase, a user may receive RSS values using a mobile application and may send unlabeled fingerprints to a server for positioning. Next, a server may utilize the radio-map for most similar labeled fingerprints to a client's fingerprint. Finally, a weighted K-nearest-neighbor (WKNN) method may be applied to extracted fingerprints to estimate a client's location.

A primary step in an offline phase may be to collect fingerprints for every single reference point (RP) in a building. Therefore, as a number of RPs may grow in large and multi-floor buildings, this phase may be very time-consuming. In addition, offline data may be highly dependent on a state of an environment regarding availability of different access points during an offline phase. Therefore, as access points' conditions may change during time due to replacement, addition, or movement, offline data may start to expire based on frequency and amount of changes. This issue may be solved by repeating the offline phase in areas that noticeable changes may have happened. However, this approach may have too much of a computational cost. Furthermore, offline data size may be dependent on a size and complication of a building. Therefore, computation overheads may increase in larger buildings.

There is, therefore, a need for a method for indoor localization with a reduced computational cost. There is further a need for method for indoor localization that may be less affected by increasing data and area in large indoor locations. There is also a need for a method that may regularly update offline data without a significant computational overhead.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for indoor localization based on previous activities. An exemplary method may include acquiring a target observation from a target user of a plurality of users, adding the target observation to a target observations list of a plurality of observations lists, obtaining one or more target clusters of a plurality of clusters for the target user, verifying that the one or more target clusters satisfy a localization condition, replacing the one or more target clusters with one or more substitute clusters of the plurality of clusters responsive to the one or more target clusters not satisfying the localization condition, localizing the target user by obtaining an estimated location of the target user based on the one or more target clusters responsive to the one or more target clusters satisfying the localization condition, localizing the target user by obtaining the estimated location of the target user based on the plurality of observations lists responsive to the one or more substitute clusters not satisfying the localization condition, and storing the estimated location in a database. An exemplary target observation may be acquired utilizing a respective access point (AP) of a plurality of APs.

An exemplary plurality of observations lists may be associated with the plurality of users. An exemplary target observations list may include a plurality of observations that may be associated with the target user. Exemplary one or more target clusters may be obtained based on the plurality of observations. Exemplary one or more substitute clusters may be associated with one or more substitute users of the plurality of users. Exemplary one or more substitute users may be different from the target user.

In an exemplary embodiment, acquiring the target observation may include sequentially aggregating elements of a target fingerprint that is associated with the target observation by performing an iterative aggregation process. An exemplary target fingerprint may include a data vector. Each iteration of an exemplary aggregation process may include identifying an APs list of a plurality of APs lists by scanning each AP of the APs list at a location of the target user, acquiring one or more received signal strength (RSS) values from identified APs in the APs list, adding one or more elements to the elements of the target fingerprint by loading the one or more RSS values to the one or more elements responsive to the identified APs not being identified in previous iterations of the aggregation process, and updating values of the one or more elements with the one or more RSS values responsive to the identified APs being identified in the previous iterations. Exemplary plurality of APs lists may be extracted from the plurality of APs. Exemplary one or more transceivers may be utilized for identifying the APs list. In an exemplary embodiment, each of the plurality of APs lists may be associated with a respective observation in the target observations list.

In an exemplary embodiment, obtaining the one or more target clusters may include obtaining an initial location estimate for the target user, acquiring a plurality of neighboring observations based on the initial location estimate, obtaining a respective visit-time of a plurality of visit-times for each respective neighboring observation of the plurality of neighboring observations by recording a respective acquisition time of each respective neighboring observation of the plurality of neighboring observations, calculating a respective freshness parameter of a plurality of freshness parameters for each respective neighboring observation of the plurality of neighboring observations based on a respective visit-time of the plurality of visit-times, selecting a starting point from a plurality of neighboring points associated with the plurality of neighboring observations, adding the starting point to a total-visited list and a queue, generating a target cluster of the one or more target clusters by repeating a clustering method until the queue becomes empty, and generating a convex hull of a convex hulls list based on a shape of the target cluster. Exemplary identified APs may be utilized for obtaining the initial location estimate and the plurality of neighboring observations. An exemplary initial location estimate associated with the target fingerprint.

In an exemplary embodiment, each of the plurality of neighboring observations may be associated with a respective neighboring point of a plurality of neighboring points that may be located in a circle with a radius $R_1$. An exemplary circle may be centered at the initial location estimate. An exemplary starting point may satisfy a clustering condition. In an exemplary embodiment, satisfying the clustering condition may include not being added to a total-visited list. In an exemplary embodiment, the convex hulls list may be associated with the one or more target clusters. An exemplary convex hull may include points of a smallest convex set that contain the shape of the target cluster.

In an exemplary embodiment, the clustering method may include obtaining a plurality of neighboring locations by acquiring each respective location of each respective neighboring observation of the plurality of neighboring observations, adding the plurality of neighboring locations to the total-visited list, assigning a respective visit-time of the plurality of visit-times to each respective neighboring location of the plurality of neighboring locations according to each respective neighboring observation of the plurality of neighboring observations, extracting a freshness list from the plurality of freshness parameters, obtaining an average freshness by calculating an average of freshness parameters in the freshness list, adding the plurality of neighboring locations to the queue and the target cluster responsive to a number of the plurality of neighboring locations being larger than a density threshold and the average freshness being larger than a freshness threshold, adding the starting point to an expanders list responsive to the plurality of neighboring locations being added to the queue, removing the starting point from the queue, and replacing the starting point with a remaining point in the queue responsive to the queue not being empty.

In an exemplary embodiment, each of the plurality of neighboring locations may satisfy a neighboring condition. An exemplary neighboring condition may include being located in a circle with a radius R centered at the starting point where $R<R_1$ and not being added to the total-visited list. Each exemplary freshness parameter in the freshness list may be associated with a respective visit-time of the plurality of visit-times.

An exemplary method may further include compression of the target cluster by removing an oldest neighboring location of the plurality of neighboring locations from the plurality of neighboring locations responsive to the oldest neighboring location not being added to the expanders list, a number of the plurality of neighboring locations remaining larger than the density threshold after removing the oldest neighboring location, and the average freshness remaining larger than the freshness threshold after removing the oldest neighboring location. An exemplary oldest neighboring location may be associated with a smallest freshness parameter in the freshness list.

In an exemplary embodiment, obtaining the estimated location based on the one or more target clusters may include merging the expanders list and the convex hulls list into an overall list, calculating an initial value of the estimated location based on a Euclidean distance between the target fingerprint and fingerprints that may be associated with respective points in the overall list, defining a constant $d_1$ as an average of Euclidean distances between the target fingerprint and fingerprints that are associated with respective points in the overall list, defining a constant $d_2$, a constant $d_3$, and a constant $d_4$ where $d_1 \leq d_2 \leq d_3 \leq d_4$, and calculating the estimated location based on the smallest Euclidean distance $d_{min}$ responsive to a condition according to $d_{min} \leq d_4$ being satisfied. An exemplary point in the overall list may include respective RSS values that are acquired from the identified APs in the APs list.

In an exemplary embodiment, calculating the estimated location may include returning the initial value as the estimated location responsive to $d_{min} \leq d_1$, obtaining the estimated location by applying a weighted k-nearest neighbors (WKNN) method on a first points set responsive to $d_1 \leq d_{min} \leq d_2$, obtaining the estimated location by applying the WKNN method on a second points set responsive to $d_2 \leq d_{min} \leq d_3$, and obtaining the estimated location by applying the WKNN method on a third points set responsive to $d_3 \leq d_{min} \leq d_4$. An exemplary first points set may include respective points of the plurality of neighboring points that are located in a circle with a radius $R_2$ centered at the initial value where $R_2 < R_1$. An exemplary second points set may include respective points of the plurality of neighboring points that are located inside respective boundaries of respective clusters that satisfy the localization condition. In an exemplary embodiment, each respective boundary may include a smallest rectangle containing a respective cluster. An exemplary third points set may include respective points of the plurality of neighboring points that are located in circles with a radius $R_3$ centered at each point in the convex hulls list.

In an exemplary embodiment, obtaining the estimated location based on the plurality of observations lists may include training an artificial neural network (ANN) based on data stored in the database, obtaining an initial estimate of the target user's location by applying the ANN on the plurality of observations lists, dividing a region containing the plurality of neighboring points into a plurality of blocks, selecting a target block of the plurality of blocks, extracting a fourth points set from the plurality of neighboring points, and obtaining the estimated location by applying the WKNN method on the fourth points set. An exemplary target block may contain the initial estimate. An exemplary fourth points set may include points in the target block.

In an exemplary embodiment, applying the WKNN method on each of the first points set, the second points set, the third points set, and the fourth points set may include adding a respective set of the first points set, the second points set, the third points set, and the fourth points set to an input points list, calculating a respective average distance of a plurality of average distances for each respective point in the input points list by averaging Euclidean distances between each respective point and each of remaining points in the input points list, obtaining a shortened list by removing each respective point associated with a respective average distance of the plurality of average distances that is shorter than a distance threshold from the input points list, and applying the WKNN method on the shortened list.

An exemplary method may further include updating each of the plurality of APs list by extracting a plurality of AP observations sets from the plurality of observations lists, calculating a respective freshness parameter of the plurality of freshness parameters for each respective observation in each of the plurality of AP observations sets, extracting a plurality of AP freshness sets from the plurality of freshness parameters, calculating an average AP freshness parameter of a plurality of average AP freshness parameters for each respective AP of the plurality of APs, calculating a visit ratio of a plurality of visit ratios for each respective AP of the plurality of APs, enabling each respective AP of the plurality of APs responsive to a respective average AP freshness parameter of the plurality of average AP freshness parameters being higher than an AP freshness threshold and a respective visit ratio of the plurality of visit ratios being higher than a visit ratio threshold, and disabling the each respective AP responsive to the respective average AP freshness parameter being lower than the AP freshness threshold. In an exemplary embodiment, each respective AP observations set of the plurality of AP observations sets may include observations acquired from each of the plurality of users by a respective AP of the plurality of APs.

In an exemplary embodiment, obtaining a respective visit-time of the plurality of visit-times may include recording a respective acquisition time of each respective observation in each of the plurality of AP observations sets. In an exemplary embodiment, each respective freshness parameter in each respective AP freshness set of the plurality of AP freshness sets may be associated with a respective observation in a respective AP observations set of the plurality of AP observations sets. In an exemplary embodiment, calculating the average AP freshness parameter may include averaging respective freshness parameters in a respective AP freshness set of the plurality of AP freshness sets. In an exemplary embodiment, enabling each respective AP of the plurality of APs may include adding each respective AP to each respective APs list of the plurality of APs list. In an exemplary embodiment, disabling the each respective AP may include removing the each respective AP from the each respective APs lists.

An exemplary method may further include updating each respective AP observation in the plurality of AP observations sets acquired from a respective user of the plurality of users by finding a respective nearest observation in the plurality of AP observations set acquired from a respective nearest user of the plurality of users and updating each respective fingerprint associated with each respective AP observation acquired from the respective user based on a nearest fingerprint associated with the respective nearest observation. In an exemplary embodiment, the respective nearest user may be located at a nearest location to the respective user. An exemplary nearest fingerprint comprising a shortest Euclidean distance to the each respective fingerprint among fingerprints associated with the respective nearest user.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 shows aggregated fingerprints, consistent with one or more exemplary embodiments of the present disclosure.

DETAILED DESCRIPTION

Figure 1A:
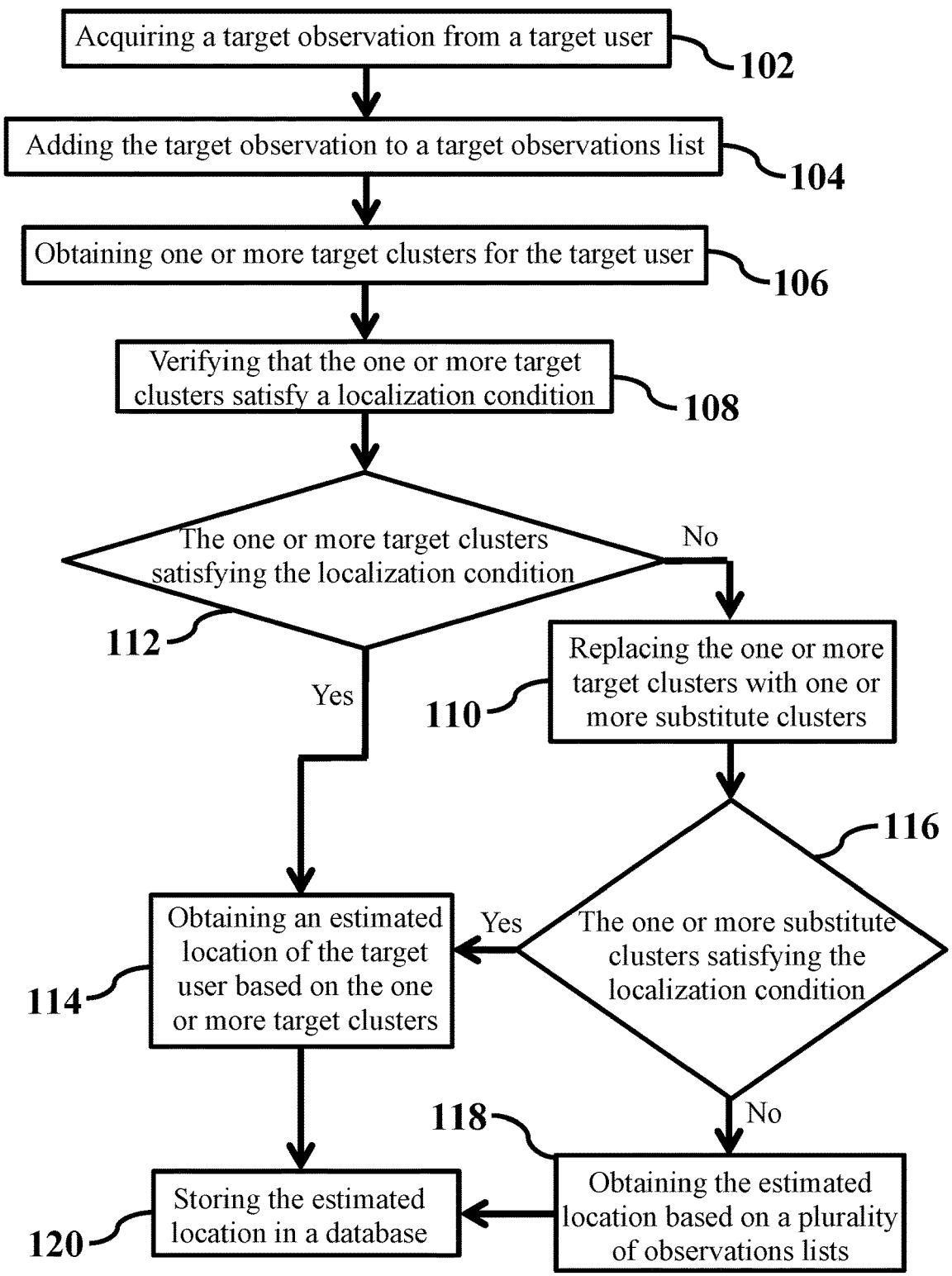
FIG. 1A shows a flowchart of a method for indoor localization based on previous activities, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

Herein is disclosed an exemplary method and system for localization of users that may visit an indoor area. In an exemplary embodiment, an indoor area may refer to a physical location (such as a building, office, or home) in which a collection of devices may be connected within a single local area network (LAN), such as a wireless LAN. In an exemplary embodiment, localization of a user may refer to obtaining the user's location inside an indoor area. An exemplary method may generate different clusters for different users based on previous locations that each user may have visited during their past activities. In an exemplary embodiment, a cluster may refer to a set of signals that may be acquired by a single user at different locations inside a connected space. Exemplary signals may be received by a transceiver (such as a mobile phone) that may be carried by each user to acquire exemplary fingerprints from different access points (APs) that may be installed on different locations in an exemplary indoor area. In an exemplary embodiment, a fingerprint may refer to a vector of received signal strength (RSS) values (i.e., strength of signals that are received from exemplary APs at exemplary transceivers) from different APs available at each point of an exemplary cluster. Exemplary acquired fingerprints may be utilized to estimate new visited locations of different users based on distances between locations of respective fingerprints and locations in available clusters for each user, as will be explained in further detail below with respect to exemplary embodiments. An exemplary method may regularly update previously acquired data (such as clusters and fingerprints) so that possible changes in an exemplary area (such as access point variations due to possible addition/removal or displacement of exemplary APs in an exemplary indoor area) may be considered in estimating exemplary users' locations.

FIG. 1A shows a flowchart of a method for indoor localization based on previous activities, consistent with one or more exemplary embodiments of the present disclosure. An exemplary method 100 may include acquiring a target observation from a target user of a plurality of users (step 102), adding the target observation to a target observations list of a plurality of observations lists (step 104), obtaining one or more target clusters of a plurality of clusters for the target user (step 106), verifying that the one or more target clusters satisfy a localization condition (step 108), replacing the one or more target clusters with one or more substitute clusters of the plurality of clusters (step 110) responsive to the one or more target clusters not satisfying the localization condition (step 112, No), localizing the target user by obtaining an estimated location of the target user based on the one or more target clusters (step 114) responsive to the one or more target clusters satisfying the localization condition (steps 112, Yes and 116, Yes), localizing the target user by obtaining the estimated location based on the plurality of observations lists (step 118) responsive to the one or more substitute clusters not satisfying the localization condition (step 116, No), and storing the estimated location in a database (step 120).

Figure 1B:
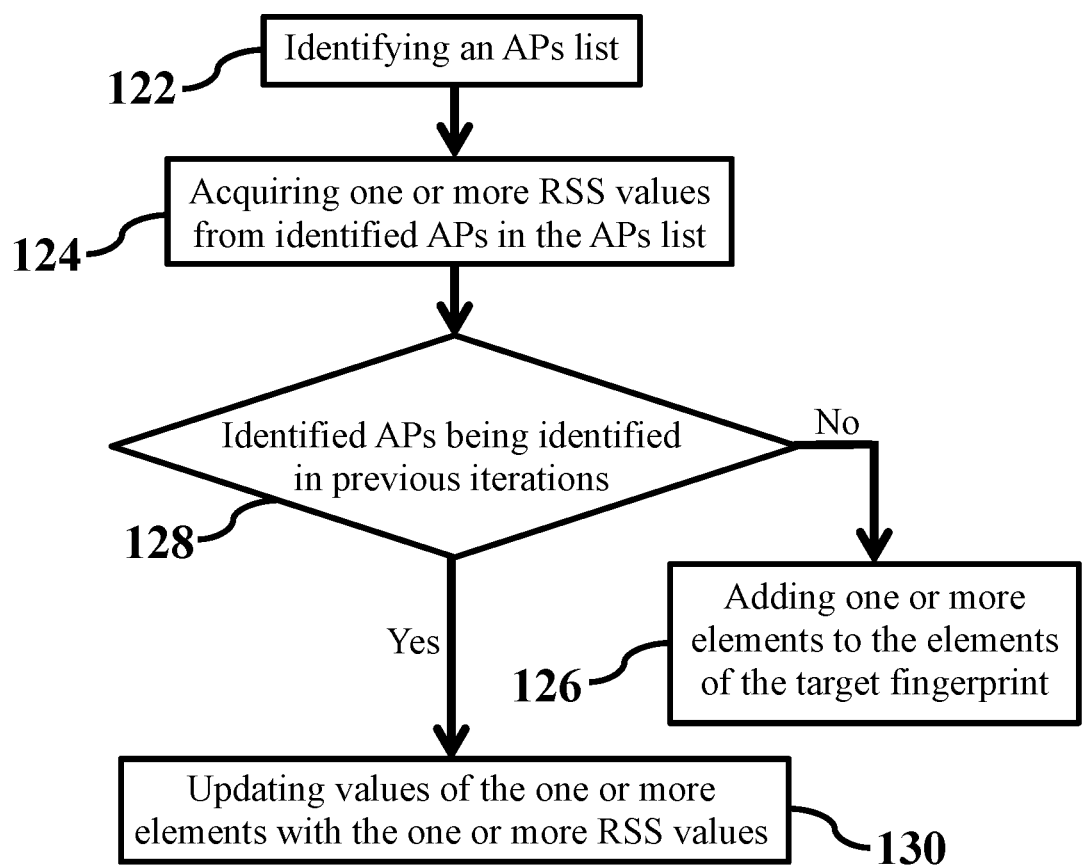
FIG. 1B shows a flowchart for one iteration of an iterative aggregation process, consistent with one or more exemplary embodiments of the present disclosure.

For further detail regarding step 102, in an exemplary embodiment, acquiring the target observation may include sequentially aggregating elements of a target fingerprint that is associated with the target observation by performing an iterative aggregation process. FIG. 1B shows a flowchart for one iteration of an iterative aggregation process in step 102, consistent with one or more exemplary embodiments of the present disclosure. An exemplary iteration 102A may include one iteration of an exemplary iterative aggregation process in step 102. In an exemplary embodiment, iteration 102A may include identifying an APs list of a plurality of APs lists by scanning each AP of the APs list at a location of the target user (step 122), acquiring one or more RSS values from identified APs in the APs list (step 124), adding one or more elements to the elements of the target fingerprint by loading the one or more RSS values to the one or more elements (step 126) responsive to the identified APs not being identified in previous iterations of the aggregation process (step 128, No), and updating values of the one or more elements with the one or more RSS values (step 130) responsive to the identified APs being identified in the previous iterations (step 128, Yes).

Figure 2:
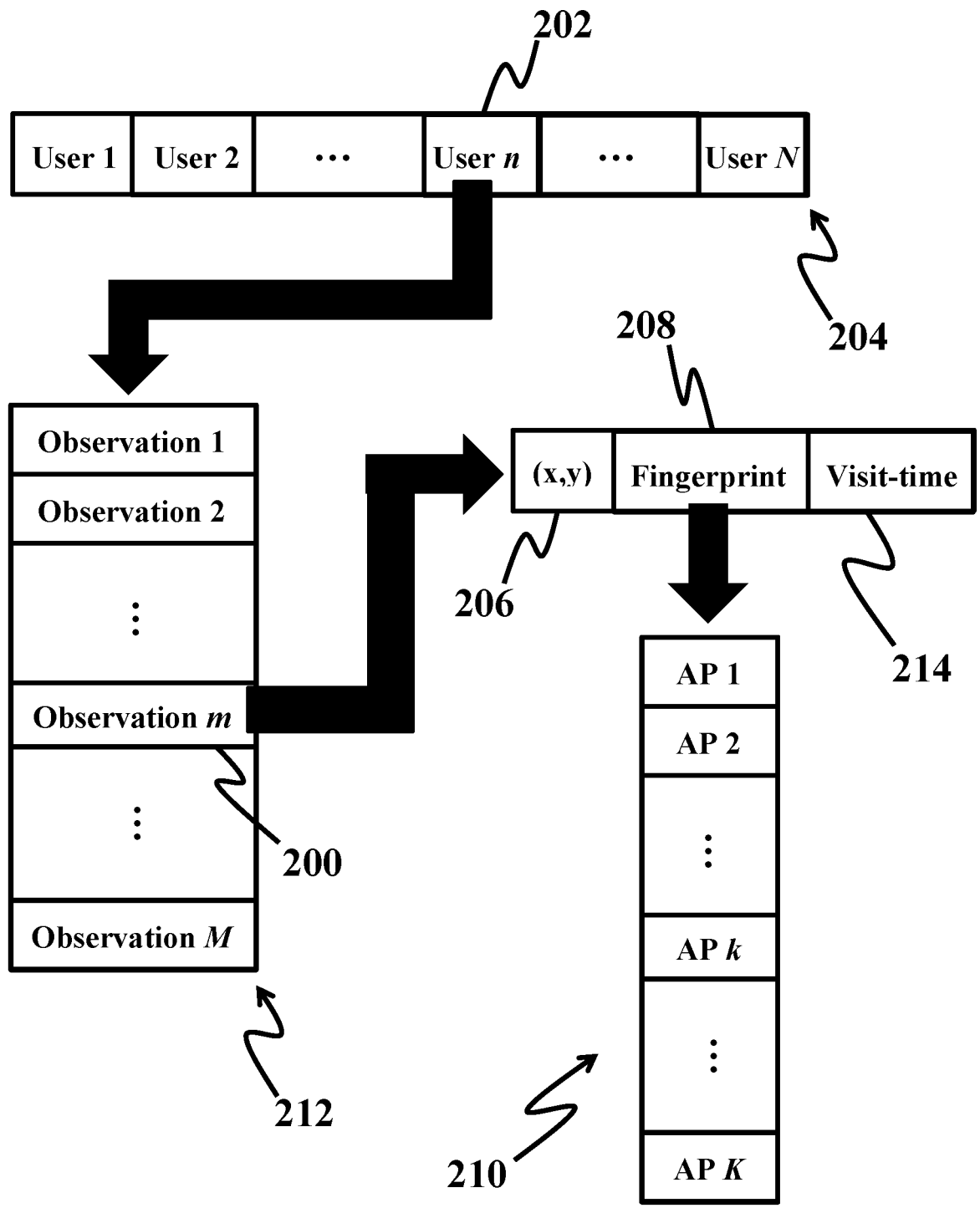
FIG. 2 shows a schematic of different objects incorporated for indoor localization, consistent with one or more exemplary embodiments of the present disclosure.

FIG. 2 shows a schematic of different objects incorporated for indoor localization, consistent with one or more exemplary embodiments of the present disclosure. In an exemplary embodiment, elements shown in FIG. 2 may be incorporated in different steps of method 100. For example, step 102 may include acquiring a target observation 200 from a target user 202 of a plurality of users 204. In an exemplary embodiment, an observation may refer to a group of signals (such as a vector of RSS values received from different APs) that may be acquired from any user of plurality of users 204 and may be stored in a database in an offline phase, i.e., before starting method 100. An exemplary observation that is acquired in the offline phase may be labeled with a (x,y) point, i.e., a location of a user of plurality of users 204 that has transmitted the observation. An exemplary positioning request (for example, a vector of RSS values acquired at an unknown location) that may be received from target user 202 in an online phase (that is, after starting method 100) may also be referred to as an observation. In an exemplary embodiment, a difference between an observation in the online phase and the offline phase is that the observation received from the user in the online phase is not labeled with a known location. Therefore, it may be labeled with an estimated location after localization and may be saved to the database. In an exemplary embodiment, target observation 200 may be labeled with an estimated location 206 after localizing target user 202 by method 100.

In an exemplary embodiment, target observation 200 may be acquired utilizing a respective AP of a plurality of APs. An exemplary AP may refer to a wireless network device that may provide a wireless connection to a computer network for other electronic devices that are equipped with a wireless devices (such as smart phones). In an exemplary embodiment, target observation 200 may also include a target fingerprint 208. In an exemplary embodiment, a fingerprint may refer to a vector of RSS values that are acquired from different APs available at each point. Exemplary collected fingerprints may be labeled with a known or estimated location and may be stored in a database.

Referring to FIGS. 1B and 2, in an exemplary embodiment, step 122 may include identifying an APs list 210 of a plurality of APs lists by scanning each AP of APs list 210 at location 206 of target user 202. Exemplary plurality of APs lists may be extracted from the plurality of APs by identifying one or more APs in each respective APs list that may transmit observable signals (i.e., signals that may be strong enough to be received by a transceiver). In an exemplary embodiment, identifying APs list 210 may include receiving RSS values from one or more APs in APs list 210. An exemplary transceiver may be utilized for identifying APs list 210. In an exemplary embodiment, a conventional wireless device, such as the target user's mobile phone, may be utilized as a transceiver to scan APs list 210 at target user's location 206.

In an exemplary embodiment, each of the plurality of APs lists may be associated with a respective observation in the target observations list. For example, APs list 210 may correspond to target observation 200. In other words, in an exemplary embodiment, each element of target fingerprint 208 may include an RSS value that is acquired from a corresponding AP in APs list 210.

In an exemplary embodiment, step 124 may include acquiring one or more RSS values from identified APs in APs list 210. Exemplary identified APs may include APs in APs list 210 that may be visible to target user 202, i.e., they may send signals with sufficiently high strength that respective RSS values may be received by exemplary transceivers at location 206 of target user 202.

In an exemplary embodiment, step 126 may include adding one or more elements to the elements of target fingerprint 208 by loading each acquired RSS value a corresponding element of target fingerprint 208. In other words, in an exemplary embodiment, if step 128 identifies a new AP in APs list 210 (i.e., an RSS value is received from an AP for a first time in iteration 102A of the aggregation process), a new element is added to target fingerprint 208. On the other hand, in an exemplary embodiment, if step 128 determines that an AP is already identified in APs list 210 (i.e., at least one RSS value has been received from the AP in a previous iteration of the aggregation process), step 130 may update a value of an existing element of target fingerprint 208 that corresponds to the identified AP with a new RSS value that is acquired from the identified AP in iteration 102A.

For further detail regarding steps 126, 128, and 130, FIG. 3 shows aggregated fingerprints, consistent with one or more exemplary embodiments of the present disclosure. Each row of an exemplary fingerprint 300 represents RSS values acquired at a corresponding iteration of the aggregation process. For example, a first row 302 is added to fingerprint 300 after scanning at a first iteration of the aggregation process. At a second iteration, a new element $AP_3$ is added to a second row 304 of fingerprint 300, whereas RSS values of existing elements $AP_1$ and $AP_2$ are updated with new RSS values. No new AP is added to a third row 306 during a third iteration of the aggregation process, whereas the RSS values of $AP_3$ and $AP_1$ are updated. A motivation behind aggregated fingerprints may be that some exemplary APs may continuously appear and disappear in sequential scans at a same location. However, a low signal strength may not always be the reason for this appearance and disappearance. In an exemplary embodiment, a noticeable number of APs' disappearance may be observed even with high RSS values (i.e., strong Wi-Fi signals). Therefore, exemplary aggregated fingerprints may allow for acquiring more consistent observation fingerprints throughout different scans.

Referring again to FIGS. 1A and 2, in an exemplary embodiment, step 104 may include adding target observation 200 to a target observations list 212 of a plurality of observations lists. An exemplary plurality of observations lists may be associated with plurality of users 204. In an exemplary embodiment, a separate observation list may be acquired for each of plurality of users 204. In an exemplary embodiment, target observations list 212 may be a list that may include a plurality of observations that may be associated with target user 202. As mentioned above, an exemplary localization result may include target observation 200 labeled with estimated location 206. In an exemplary embodiment, while target user 202 may be doing activities or present in an indoor region, different observations may be continuously generated and added to target observations list 212 as a result of positioning requests. In an exemplary embodiment, each generated observation in target observations list 212 may be stored in a database for target user 202. Therefore, each exemplary user of plurality of users 204 may have a separate list of previous observations associated with a respective user in the database. In an exemplary embodiment, an observation may be identifiable by a pair of (x,y) as this pair may be set to be unique in the database. As a result, a new observation with a same (x,y) may replace an old one. Therefore, records of each user of plurality of users 204 may be kept limited and easier to manage.

Figure 1C:
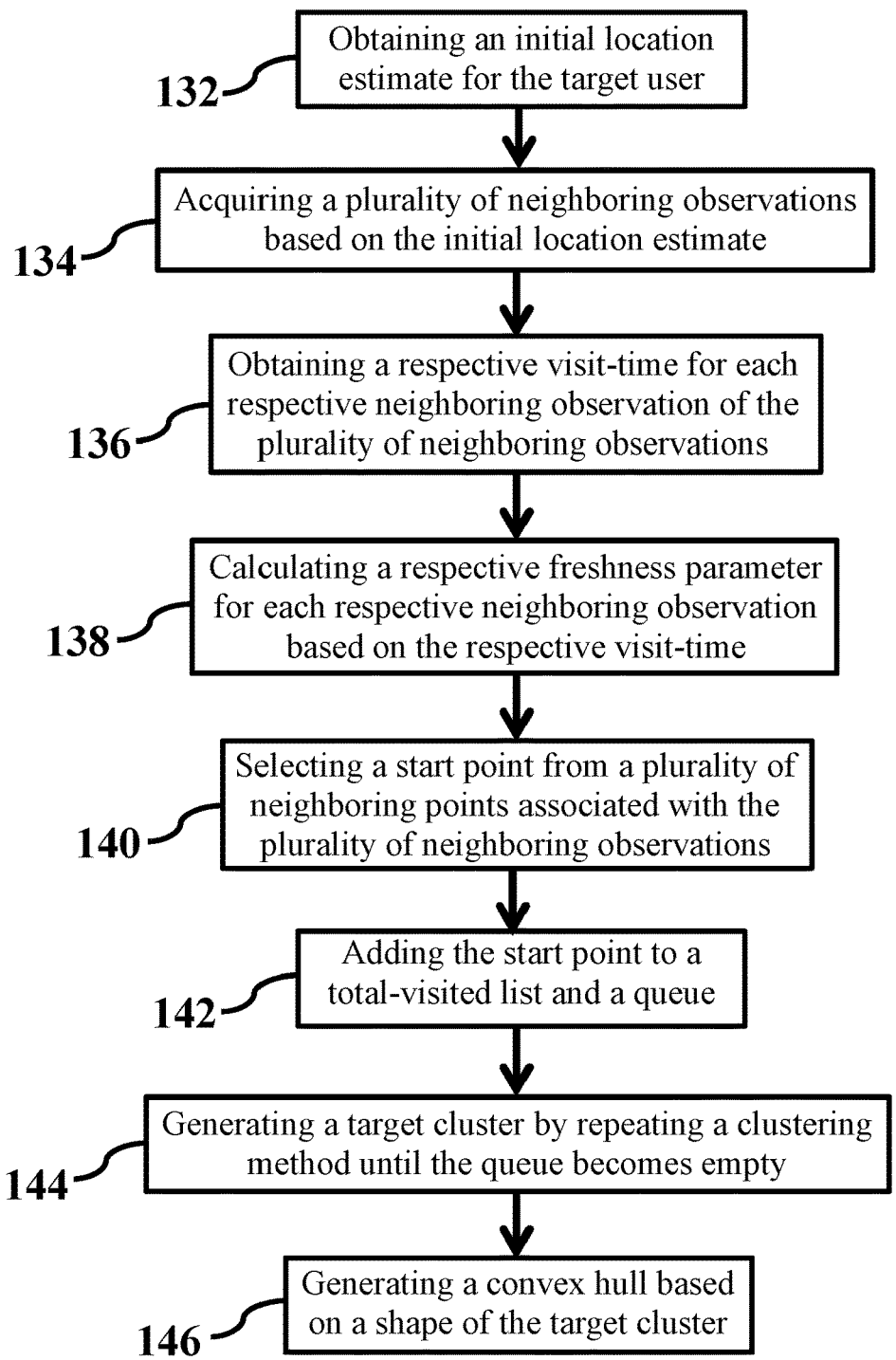
FIG. 1C shows a flowchart for obtaining one or more target clusters for a target user, consistent with one or more exemplary embodiments of the present disclosure.

In an exemplary embodiment, step 106 may include obtaining one or more target clusters of a plurality of clusters for target user 202. Exemplary one or more target clusters may be obtained based on plurality of observations 212. FIG. 1C shows details of step 106 in a flowchart for obtaining one or more target clusters for a target user, consistent with one or more exemplary embodiments of the present disclosure. In an exemplary embodiment, obtaining the one or more target clusters in step 106 may include obtaining an initial location estimate for target user 202 (step 132), acquiring a plurality of neighboring observations based on the initial location estimate (step 134), obtaining a respective visit-time of a plurality of visit-times for each respective neighboring observation of the plurality of neighboring observations by recording a respective acquisition time of each respective neighboring observation of the plurality of neighboring observations (step 136), calculating a respective freshness parameter of a plurality of freshness parameters for each respective neighboring observation of the plurality of neighboring observations based on a respective visit-time of the plurality of visit-times (step 138), selecting a starting point from a plurality of neighboring points associated with the plurality of neighboring observations (step 140), adding the starting point to a total-visited list and a queue (step 142), generating a target cluster of the one or more target clusters by repeating a clustering method until the queue becomes empty (step 144), and generating a convex hull of a convex hulls list based on a shape of the target cluster (step 146).

In an exemplary embodiment, step 132 may include obtaining an initial location estimate for target user 202 based on data acquired in an offline phase. Exemplary identified APs in APs list 210 may be utilized for obtaining the initial location estimate. An exemplary initial location estimate may be associated with target fingerprint 208. In an exemplary embodiment, a Euclidean distance between target fingerprint 208 and each respective fingerprint of every other observation in target observations list 212 (that may be acquired in the offline phase or previous executions of method 100) may be calculated according to the following:

$$d(FP_1, FP_2) = \sum_{i=1}^{max(k1,k2)} \sqrt{\overline{RSS_{1,i}} - \overline{RSS_{2,i}}} \qquad \text{Equation (1)}$$

where $FP_1$ is target fingerprint 208 given by $FP_1 = (RSS_{1,1}, RSS_{1,2}, \ldots, RSS_{1,k1})$, $FP_2$ represents a fingerprint of any other observation in target observations list 212 and is given by $FP_2 = (RSS_{1,1}, RSS_{1,2}, \ldots, RSS_{1,k2})$, and $d(FP_1, FP_2)$ is a Euclidean distance between $FP_1$ and $FP_2$. Since a number of identified APs (stored in different APs lists) may be different for different observations in target observations list 212, sizes of $FP_1$ (i.e., $k_1$) and $FP_2$ (i.e., $k_2$) may be different. Therefore, in an exemplary embodiment, a minimum predefined value may be assigned to any RSS that may correspond to an unidentified AP for fingerprints in Equation (1). An exemplary minimum predefined value may be set in a range of (−120, −80) dB as a sign of not acquiring any signal from a respective AP. An exemplary fingerprint that may result in a minimal Euclidean distance in Equation (1) may be selected for estimating the initial location estimate. In an exemplary embodiment, a (x,y) label (analogous to estimated location 206) of an observation corresponding to the selected fingerprint may be assigned to target observation 200 as the initial location estimate for target user 202.

In an exemplary embodiment, step 134 may include acquiring a plurality of neighboring observations based on the initial location estimate. Exemplary identified APs in APs list 210 may be utilized for obtaining the plurality of neighboring observations. In an exemplary embodiment, each of the plurality of neighboring observations may be associated with a respective neighboring point of a plurality of neighboring points. A separate observation (similar to target observation 200) of the plurality of neighboring observations may be acquired at each exemplary point of the plurality of neighboring points by one or more identified APs of the plurality of APs. In an exemplary embodiment, each of the plurality of neighboring points may be located in a circle with a radius $R_1$. An exemplary circle may be centered at the initial location estimate. In an exemplary embodiment, the plurality of neighboring points may be given by the following equation:

$$L=\{p|p\in A, (p_x-obs_x)^2+(p_y-obs_y)^2\le (R_1)^2\} \quad \text{Equation (2)}$$

where L is a set containing the plurality of neighboring points, p is a neighboring point of the plurality of neighboring points, A is target observations list 212, $p_x$ and $p_y$ are respectively horizontal and vertical elements of point p in a Cartesian coordinate system, and $obs_x$ and $obs_y$ are horizontal and vertical elements of the initial location estimate, respectively. A presence level of target user 202 may be controlled with radius $R_1$. Increasing radius $R_1$ may increase an impact of older observations of target user 202 in previous executions of method 100 on estimating the current location of target user 202.

In an exemplary embodiment, step 136 may include obtaining a respective visit-time of a plurality of visit-times for each respective neighboring observation of the plurality of neighboring observations. Referring again to FIG. 2, in an exemplary embodiment, target observation 200 may be labeled with a visit-time 214. In an exemplary embodiment, a visit-time of an observation may refer to a timestamp (in milliseconds) indicating a moment that the observation is received from a respective user. For instance, a time-visit equal to 1520098773659 may refer to Mar. 3, 2018, 17:39:33. In an exemplary embodiment, when target observation 200 is acquired from target user 202, visit-times of each of the plurality of neighboring observations may be updated by setting a respective acquisition time of each respective neighboring observation to a current timestamp of a computer server that may be configured to record and store the plurality of neighboring observations. In an exemplary embodiment, by updating visit-times of the neighboring observations, a presence of target user 202 in an area of an indoor region may be recorded instead of a presence at a single point.

In an exemplary embodiment, step 138 may include calculating a respective freshness parameter for each respective neighboring observation of the plurality of neighboring observations according to an operation defined by the following:

$$G(x) = \max\left(\frac{stime - \beta*(stime - x_{visitTime})}{stime}, 1\right) \quad \text{Equation (3)}$$

where x is a respective neighboring observation, G(x) is freshness parameter of neighboring observation x, stime is a moment of calculating the freshness parameter G(x), β is a scaling constant, $x_{visitTime}$ is a respective visit-time of observation x, and max returns a largest value of given arguments. In an exemplary embodiment, function G maps an observation to a value in [0,1], showing a degree of recency (i.e., freshness) of the observation. In an exemplary embodiment, β may be a constant that may be used to scale the fraction in Equation (3). Moreover, β may control a speed of the freshness parameter decay. For example, β may be set to a value that decreases freshness of an observation by approximately 0.1 every ten days.

In an exemplary embodiment, step 140 may include selecting a starting point from the plurality of neighboring points. In an exemplary embodiment, a point with a largest horizontal (x) and vertical (y) elements among the plurality of neighboring points may be selected as the starting point. An exemplary starting point may satisfy a clustering condition. An exemplary clustering condition may include not being added to a total-visited list. An exemplary total-visited list may include a list of points that are either members of an existing cluster (that may have been generated in a previous execution of method 100) or are visited by an existing cluster, as described below in further detail.

In an exemplary embodiment, step 142 may include adding the starting point to the total-visited list and a queue. An exemplary queue may include points that may serve as starting points for a step-by-step expansion of an exemplary target cluster while the target cluster is being generated in step 106, as described below in further detail.

In an exemplary embodiment, an appropriate selection of the starting point may be critical for successfully obtaining a target cluster for target user 202 in step 106. Therefore, if an exemplary starting point does not lead to a target cluster, it may be replaced with a new starting point in a subsequent execution of method 100. Therefore, in an exemplary embodiment, the starting point may be added to the total-visited list in step 142 so that it is not used as a starting point in a future execution of method 100 due to violation of an exemplary clustering condition.

Figure 1D:
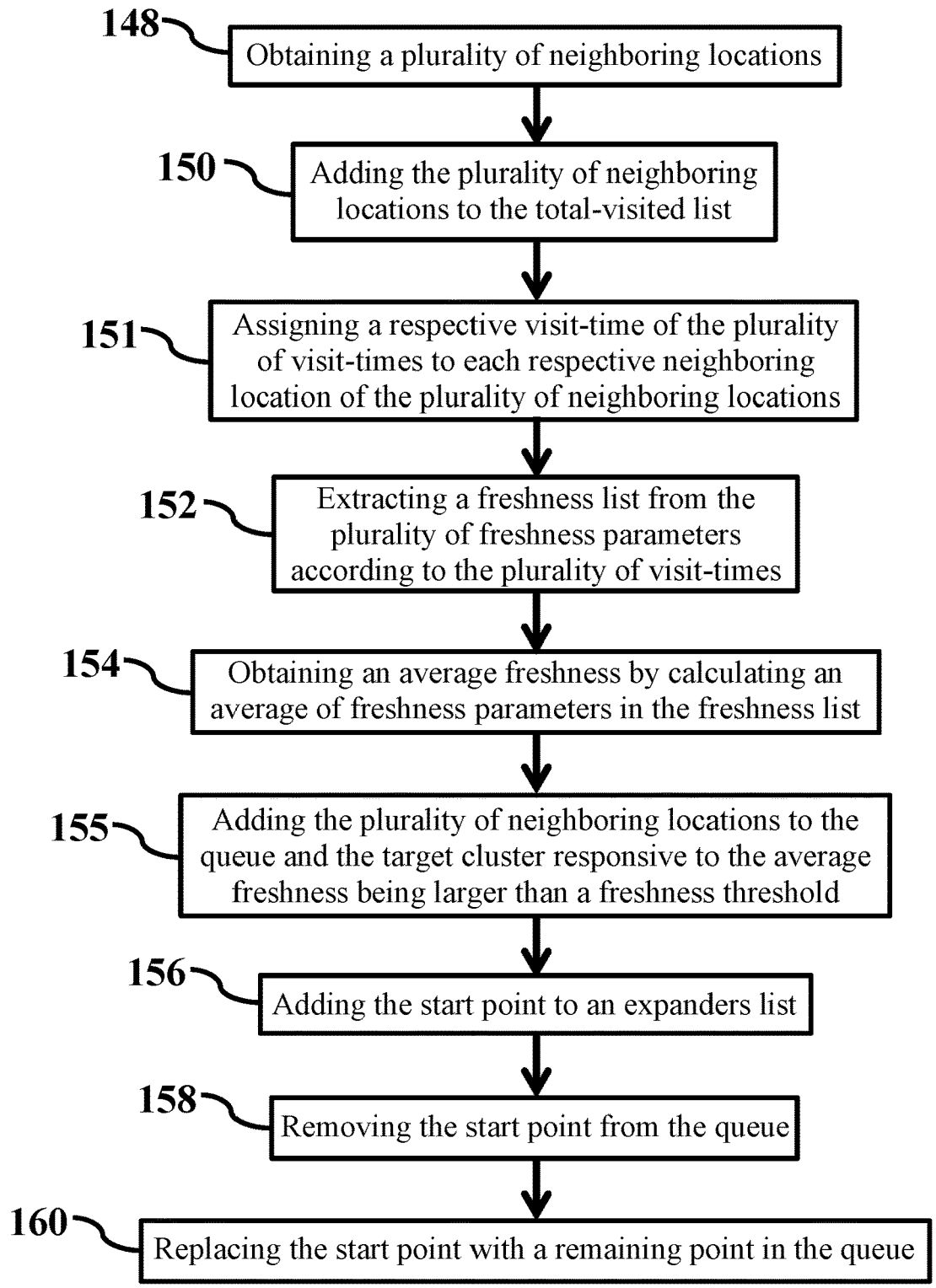
FIG. 1D shows a flowchart for a clustering method, consistent with one or more exemplary embodiments of the present disclosure.

For further detail with regards to step 144, FIG. 1D shows a flowchart for a clustering method, consistent with one or more exemplary embodiments of the present disclosure. In an exemplary embodiment, the clustering method may include obtaining a plurality of neighboring locations by acquiring each respective location of each respective neighboring observation of the plurality of neighboring observations (step 148), adding the plurality of neighboring locations to the total-visited list (step 150), assigning a respective visit-time of the plurality of visit-times to each respective neighboring location of the plurality of neighboring locations according to each respective neighboring observation of the plurality of neighboring observations (step 151), extracting a freshness list from the plurality of freshness parameters according to the plurality of visit-times (step 152), obtaining an average freshness by calculating an average of freshness parameters in the freshness list (step 154), adding the plurality of neighboring locations to the queue and the target cluster responsive to a number of the plurality of neighboring locations being larger than a density threshold and the average freshness being larger than a freshness threshold (step 155), adding the starting point to an expanders list responsive to the plurality of neighboring locations being added to the queue (step 156), removing the starting point from the queue (step 158), and replacing the starting point with a remaining point in the queue responsive to the queue not being empty (step 160). In an exemplary embodiment, a remaining point may refer to any point in the queue that may be different from the starting point.

In further detail with respect to step 148, in an exemplary embodiment, each of the plurality of neighboring locations may be acquired by extracting a (x,y) label (analogous to location 206) of a corresponding neighboring observation (analogous to target observation 200). In an exemplary embodiment, the (x,y) label may have been stored in the database in a previous execution of method 100 and therefore, it may be loaded from the offline data.

In an exemplary embodiment, each of the plurality of neighboring locations may satisfy a neighboring condition. An exemplary neighboring condition may include being located in a circle with a radius R centered at the starting point where $R<R_1$ (defined in Equation (2) above) and not being added to the total-visited list. By satisfying the condition $R<R_1$, in an exemplary embodiment, the plurality of neighboring locations may be limited to locations that target user 202 may have visited in the current or in previous executions of method 100 and thereby increasing the clustering precision for target user 202. If an exemplary location is already added to the total-visited list, it may have been already used in a previous iteration of clustering method 144 and therefore, it may be excluded from the current iteration.

In an exemplary embodiment, step 150 may include adding the plurality of neighboring locations to the total-visited list. As a result, exemplary plurality of neighboring locations may not serve as a starting point for generating a different cluster in succeeding executions of method 100, as mentioned above in step 142. Therefore, in an exemplary embodiment, different clusters that may be generated for different users of plurality of users 204 may not interfere with each other.

Figure 4:
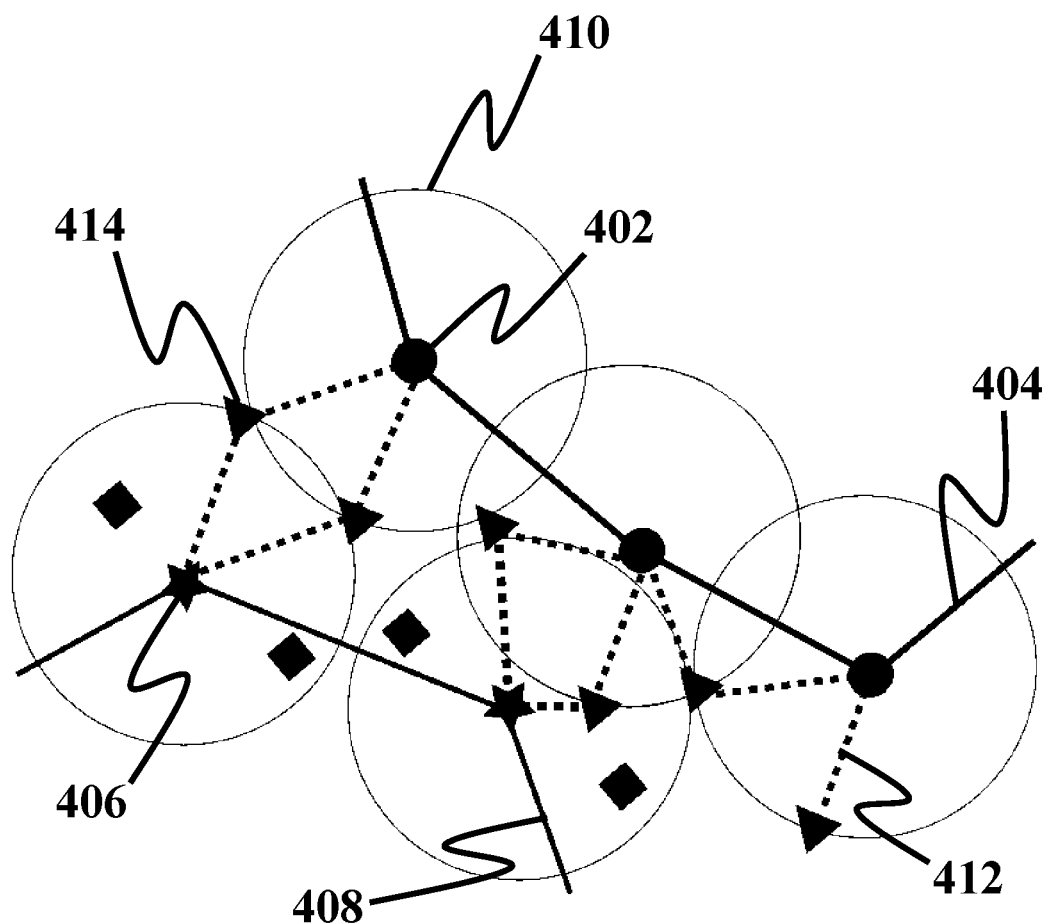
FIG. 4 shows a schematic of two neighboring clusters, consistent with one or more exemplary embodiments of the present disclosure.

FIG. 4 shows a schematic of two neighboring clusters, consistent with one or more exemplary embodiments of the present disclosure. Circular points in FIG. 4 (for example, point 402) represent exemplary border points that are located at a border of an exemplary first cluster 404 (similar to the target cluster generated in step 144), whereas star-shaped points (for example, point 406) represent exemplary border points that are located at a border of an exemplary second cluster 408 (similar to the target cluster generated in step 144). Exemplary circles with radius R around each border point contain exemplary plurality of neighboring locations that satisfy the neighboring condition (similar to the plurality of neighboring locations defined in step 148) of that border point. For example, a circle 410 contains neighboring locations of point 402. Exemplary triangular points represent a neighboring location that is located at a distance equal to radius R (represented by dashed lines such as dashed line 412) from each border point. For example, a triangular point 414 is located at distance R from border point 402. Since each triangular point is observed by a respective border point (i.e., located inside a circle with radius R around each border point), in an exemplary embodiment, the triangular points may be added to the total-visited list while generating each of first cluster 404 and second cluster 408 in step 150. As a result, in an exemplary embodiment, the triangular points may not be included in any of first cluster 404 and second cluster 408. Therefore, a distance between borders of first cluster 404 and second cluster 408 may be at least R, thereby preventing interference of neighboring clusters.

Referring again to FIGS. 1D, 2, and 4, in an exemplary embodiment, step 151 may include assigning a respective visit-time (analogous to visit-time 214) to each respective neighboring location (similar to point 414) of the plurality of neighboring locations. In an exemplary embodiment, a visit-time of a previously recorded neighboring observation (analogous to target observation 200) with a (x,y) similar to coordinates of a neighboring location may be assigned to the neighboring location as its visit-time. In an exemplary embodiment, assigned visit-times may be utilized for calculating a freshness parameter for each of the plurality of neighboring locations according to Equation (3), as described above.

In an exemplary embodiment, step 152 may include extracting a freshness list from the plurality of freshness parameters. Each exemplary freshness parameter in the freshness list may be associated with a respective visit-time of the plurality of visit-times. In an exemplary embodiment, each freshness parameter in the freshness list may be calculated based on a visit-time of a corresponding neighboring location, as described above. Therefore, an exemplary freshness parameter in the freshness list may demonstrate a freshness level of a corresponding neighboring observation of target user 202. In an exemplary embodiment, freshness of an observation may refer to a degree of recency of the observation, as defined in Equation (3)

In further detail with regards to step 154, in an exemplary embodiment, an exemplary average freshness may be obtained by calculating an average of freshness parameters in the freshness list. An exemplary average calculation may simply include dividing a sum of freshness parameters in the freshness list by the length of the freshness list. In an exemplary embodiment, a weighted average may be calculated by assigning a larger weight to freshness parameters that have been obtained for neighboring locations that are closer to the starting point. As a result, in an exemplary embodiment, a freshness level of the plurality of neighboring locations may be evaluated by the average freshness, so that it may be decided in step 144 whether to include the plurality of neighboring locations in the target cluster.

In further detail with respect to step 155, in an exemplary embodiment, if a number of the plurality of neighboring locations is larger than a density threshold and also the average freshness is larger than a freshness threshold, the plurality of neighboring locations may be added to the target cluster and the queue so that they may be used as new starting points for expanding the target cluster in subsequent iterations of step 144. In an exemplary embodiment, the density threshold may refer to a minimum number of locations inside a neighborhood of the starting point (i.e., a circle with radius R centered at the starting point, which satisfies the neighboring condition in step 148) that may be required to add the plurality of neighboring locations to the target cluster and the queue. An exemplary density threshold may represent a minimum acceptable density of a neighborhood of the starting point. In addition, an exemplary freshness threshold may represent a minimum acceptable freshness of neighboring locations of the starting point. In an exemplary embodiment, values of the density threshold and the freshness threshold may be selected empirically based on previous activities of plurality of users 204 that may have been stored in a database. Exemplary thresholds may be utilized to avoid an over-expansion of a cluster to areas with a negligible probability of a user's presence, as described in more detail below.

Figure 5:
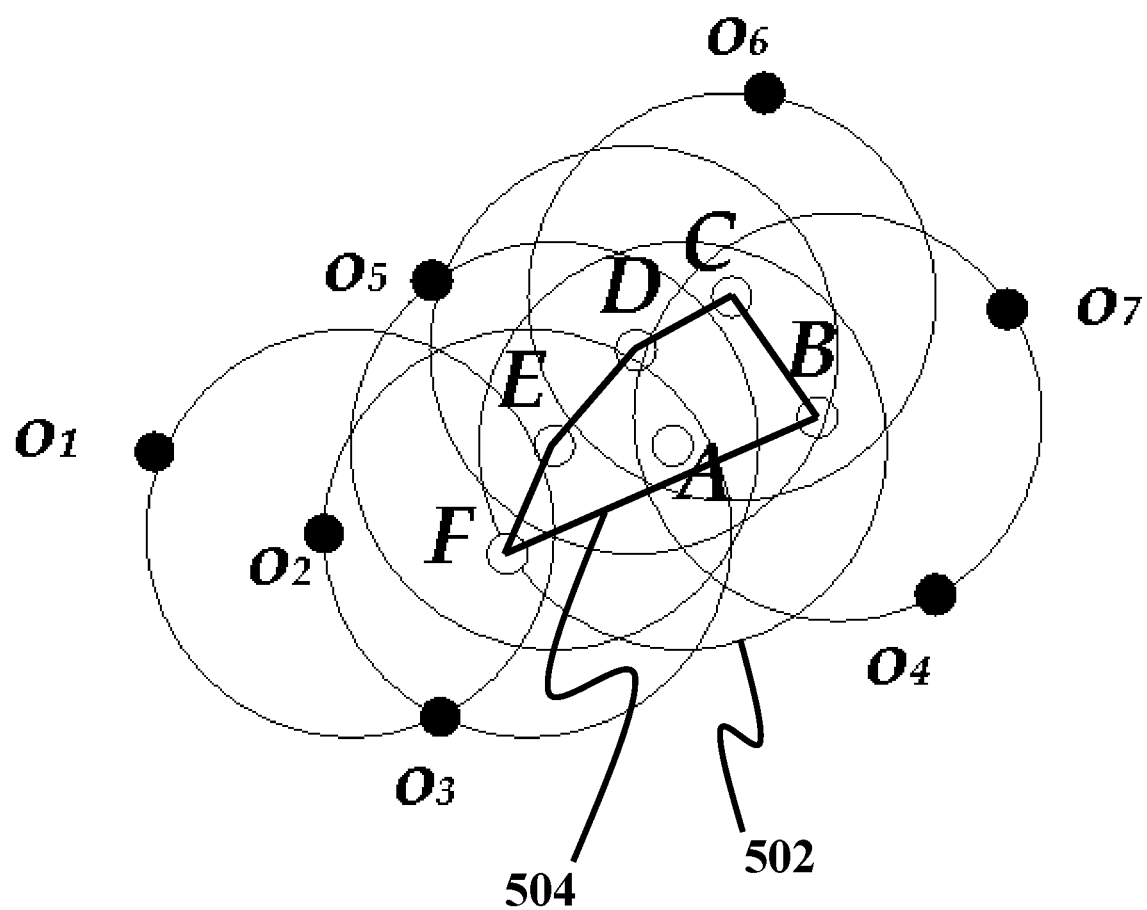
FIG. 5 shows an over-expanded cluster, consistent with one or more exemplary embodiments of the present disclosure.

For further detail regarding steps 151-155, FIG. 5 shows an over-expanded cluster, consistent with one or more exemplary embodiments of the present disclosure. In an exemplary embodiment, growth of an exemplary cluster 500 to non-dense area in one or more directions may be referred to as an over-expansion. For further detail regarding over-expansion, an exemplary point A represents a starting point with a set of {B, C, D, E, F} as a respective plurality of neighboring locations that are located inside a circle 502. An exemplary density threshold may be set to 3. In an exemplary embodiment, point B may add new locations $\{O_4, O_7\}$ to cluster 500 since the number of neighboring locations of point B is larger than the density threshold. Next, C may add $O_6$, D may add $O_5$, F may add $\{O_2, O_3\}$, and finally, $O_2$ may add $O_1$ to cluster 500. However, $\{O_1, \ldots, O_7\}$ may not be really close to {A, B, C, D, E, F}. Therefore, in an exemplary embodiment, cluster 500 may have over-expanded to $\{O_1, \ldots, O_7\}$. In an exemplary embodiment, this issue may rise because some observations may be visited more than once. For example, B is using {A, D, C} as its neighbors to increase its local density (i.e., number of neighboring locations), which may result in adding $\{O_7, O_4\}$. However, A had previously visited {D, C}. The over-expansion problem may be solved by calculating the density of neighbors using only the new unvisited observations. In an exemplary embodiment, the freshness threshold may be utilized to avoid including locations of old observations in the plurality of neighboring locations, thereby preventing over-expansion of cluster 500.

In further detail with respect to step 156, in an exemplary embodiment, if the plurality of neighboring locations are added to the queue in step 156, the starting point may be added to an expanders list in step 156. In an exemplary embodiment, an expanders list may refer to list of locations that may be utilized for growing a respective cluster. An exemplary expanders list may include locations of observations that may be determined to have dense and fresh neighbors (based on density and freshness thresholds, as described above in step 155). While generating the target cluster, such exemplary observations may be tagged as expanders to be utilized later for expanding the target cluster by adding their respective neighbors to the target cluster. For instance, point A in FIG. 5 is an expander. Exemplary expanders may also be utilized in obtaining the estimated location of target user 202, as described in subsequent steps of method 100.

In an exemplary embodiment, after the plurality of neighboring locations are added to the queue, the starting point may be removed from the queue in step 158 since it may have done its role in expanding the target cluster by observing and possibly adding of the plurality of neighboring locations to the target cluster. If an exemplary queue becomes empty after removing the starting point, clustering method 144 may reach to an end. Otherwise, in an exemplary embodiment, the starting point may be replaced with a remaining point in the queue in step 160 and step 144 may be repeated until the queue becomes empty. An exemplary new starting point may be selected from remaining points in the queue, similar to choosing the starting point in step 140 described above.

In an exemplary embodiment, a number of the plurality of neighboring locations of target user 202 may grow quickly even while using the freshness parameter, making a clustering method's speed degrade over time. To avoid generation of an oversized target cluster, in an exemplary embodiment, method 100 may further include compression of the target cluster. An exemplary cluster compression may have two features. First, a shape of an exemplary cluster may remain almost intact. Second, an average freshness of an exemplary cluster may not decrease. In an exemplary embodiment, a shape of the target cluster may be specified by its expander observations in the expanders list. Therefore, exemplary extra observations may be removed in a way that the compressed cluster's expander observations remain the same.

An exemplary cluster compression may include removing an oldest neighboring location of the plurality of neighboring locations from the plurality of neighboring locations responsive to the oldest neighboring location not being added to the expanders list, a number of the plurality of neighboring locations remaining larger than the density threshold after removing the oldest neighboring location, and the average freshness remaining larger than the freshness threshold after removing the oldest neighboring location. An exemplary oldest neighboring location may be associated with a smallest freshness parameter in the freshness list.

In an exemplary embodiment, the oldest neighboring location may be obtained by finding a neighboring location that may have a smallest freshness parameter in the freshness list. Therefore, an exemplary oldest neighboring location may have been observed before other neighboring locations. Therefore, in an exemplary embodiment, removing the oldest neighboring location may have a minimal impact on the target cluster. However, in an exemplary embodiment, the above mentioned conditions may also be checked prior to removing the oldest neighboring location. In an exemplary embodiment, if the oldest neighboring location has been added to the expanders list, it may not be removed from the plurality of neighboring locations since expanders may be utilized for finding the estimated location of target user 202, as described in subsequent steps of method 100. Furthermore, in an exemplary embodiment, a number and average freshness of remaining locations of the plurality of neighboring locations may have to remain above the density threshold and the freshness threshold, respectively, after removing the oldest neighboring location. Otherwise, in an exemplary embodiment, removing the oldest neighboring location may result in removing the plurality of neighboring locations from the target cluster, as described above in step 155.

In an exemplary embodiment, the cluster compression procedure may ensure that every expander observation remains an expander after the compression. Furthermore, by removing extra observations, an exemplary average freshness may nearly remain unchanged. In an exemplary embodiment, a cluster's shape may also be remain unchanged after compression. Nevertheless, in an exemplary embodiment, removed locations may be maintained in a preExpanders list if they are to be utilized later in method 100.

In an exemplary embodiment, clustering method 144 may be triggered periodically (for example, once a day) for all of plurality of users 204. However, some users may be more active than others. Hence, in an exemplary embodiment, a frequency of cluster recreation may be distinct for different users. In an exemplary embodiment, a variable may be kept for each user in the database that shows a number of recently added observations since a last execution of clustering method 144 for a specific user. When an exemplary variable reaches a certain amount for a user, it may be set to zero, and clustering method 144 may be triggered to update exemplary clusters asynchronously. Therefore, clustering method 144 may not be triggered unnecessarily when a user's activity has not considerably changed since a previous execution of method 100.

Referring again to FIG. 1C, in an exemplary embodiment, step 146 may include generating a convex hull of a convex hulls list based on a shape of the target cluster. An exemplary convex hulls list may be associated with the one or more target clusters. In an exemplary embodiment, a separate convex hull may be obtained for each different cluster of the one or more target clusters and may be added to the convex hulls list. An exemplary convex hull may include points of a smallest convex set that contain the shape of the target cluster. Therefore, in an exemplary embodiment, a convex hull of a cluster may be generated by finding a smallest convex set that may fit the cluster. An exemplary convex hull 504 for cluster 500 is represented in FIG. 5. In an exemplary embodiment, the convex hulls list may be utilized in obtaining the estimated location of target user 202, as described in subsequent steps of method 100.

Referring again to FIG. 1A, in an exemplary embodiment, step 108 may include verifying that the one or more target clusters satisfy a localization condition by calculating a respective rank in a ranks set E for each of the one or more target clusters. In an exemplary embodiment, since more than one cluster may be generated for target user 202 in step 106, a separate rank may be calculated for each generated cluster. Exemplary clusters that may have higher ranks may be selected for localizing target user 202. Calculating an exemplary rank may include calculating a weighted access point ratio (WAPR) for each target cluster according to an operation defined by the following:

$$WAPR = \frac{\sum_{i=1}^{k_1} T(av_i, uv_i)}{k_1} \qquad \text{Equation (4)}$$

where $k_1$ is a number of elements of APs list 210, $uv_i$ is an RSS value acquired by an $i^{th}$ AP in APs list 210 where $1 \leq i \leq k_1$, $av_i$ is an average of RSS values acquired by the $i^{th}$ AP in each of the plurality APs lists, and $T(av_i, uv_i)$ is a function defined by the following:

$$T(av_i, uv_i) = 1 - \frac{|av_i - uv_i|}{|\varepsilon|} \qquad \text{Equation (5)}$$

where $\varepsilon$ is a minimum threshold of RSS values (for example, −120 dB). In an exemplary embodiment, function $T(av_i, uv_i)$ may only be valid for APs that are visible in each target cluster. If an exemplary AP is visible only in a target cluster, function $T(av_i, uv_i)$ may return zero.

In an exemplary embodiment, each respective rank of a target cluster may be obtained by calculating a weighted average of the WAPR and the average freshness according to the following:

$$\text{rank} = \mathcal{W}_f \times FN + \mathcal{W}_a \times WP \qquad \text{Equation (6)}$$

where $\mathcal{W}_f$ and $\mathcal{W}_a$ are applied weights for averaging, and FN and WP are the average freshness and WARP of a target cluster, respectively. In an exemplary embodiment, $\mathcal{W}_f = 0.1$ and $\mathcal{W}_a = 0.9$ may be used.

In an exemplary embodiment, after obtaining ranks of the one or more target clusters, a set of clusters that satisfy the localization condition may be obtained according to the following:

$$\mathcal{Z} = \{c | c \in E, \gamma - \delta \leq c_{rank} \leq \gamma\} \cup \{\hbar\} \qquad \text{Equation (7)}$$

where $\mathcal{Z}$ includes clusters that satisfy the localization condition, $\gamma$ is a highest rank in ranks set E, $\hbar$ is a cluster among the one or more target clusters with highest rank $\gamma$, c is a rank in ranks set E that corresponds to a cluster of the one or more target clusters that satisfy the localization condition, and $\delta$ is a lower limit of a rank difference for satisfying the localization condition. In an exemplary embodiment, $\delta$ may be considered as a threshold for selecting appropriate clusters that may be used for localizing target user 202.

In an exemplary embodiment, if clusters set $\mathcal{Z}$ is empty after executing step 106, it may be determined in step 112 that that the one or more target clusters may not satisfy the localization condition. In other words, in an exemplary embodiment, either no cluster may have been generated in step 106 or none of generated clusters may be appropriate for localization of target user 202. Therefore, in an exemplary embodiment, the one or more target clusters may be replaced with one or more substitute clusters of the plurality of clusters in step 110. Exemplary one or more substitute clusters may be associated with one or more substitute users of plurality of users 204. Exemplary one or more substitute users may be different from target user 202. In an exemplary embodiment, each of the one or more substitute clusters may have been generated for a corresponding substitute user in a previous execution of method 100 and may have been stored in the database. In an exemplary embodiment, the one or more substitute clusters may be selected by finding a substitute user that may have more different observations from target observations in target observations list 212 than other substitute users. Specifically, in an exemplary embodiment, observations with more different location labels (analogous to location 206) from the initial location of target user 202 may be preferred since it may have been determined in steps 110 and 112 that starting a clustering method from a starting point that is close to the initial location estimate may fail to generate appropriate clusters. Therefore, in an exemplary embodiment, a smallest rectangle (referred to as boundary) that may contain locations of observations in each observations list (similar to observations list 212) may be obtained for each of plurality of users 204. In an exemplary embodiment, an intersection amount of substitute users' boundaries with the target user's boundary may be calculated. In an exemplary embodiment, clusters of a substitute user that may have a least boundary intersection with target user 202 may be selected to replace the one or more target clusters.

In an exemplary embodiment, if step 112 determines that that the one or more target clusters may not satisfy the localization condition, or step 116 determines that the one or more substitute clusters may satisfy the localization condition, method 100 may proceed to step 114 to obtain the estimated location of target user 202 based on the one or more target clusters (or the one or more substitute clusters that may have replaced the one or more target clusters in step 110).

In further detail regarding step 114, in an exemplary embodiment, obtaining the estimated location may include merging the expanders list and the convex hulls list into an overall list P by adding each location in the expanders list or the convex hulls list to overall list P. Next, an exemplary initial value $\vartheta$ of the estimated location may be calculated according to a set of operations defined by the following:

$$\vartheta = \min_{p \in P} ED(usrFP, p) \quad \text{Equation (8a)}$$

$$d_{min} = ED(\vartheta, usrFP) \quad \text{Equation (8b)}$$

where ED(usrFP,p) is a Euclidean distance between target fingerprint usrFP and a fingerprint p and $$\min_{p \in P}$$

returns a point in overall list P that corresponds to a smallest Euclidean distance $d_{min}$. In an exemplary embodiment, p may refer to a respective point in overall list P and may include respective RSS values that may be acquired from the identified APs in APs list 210. An exemplary a constant $d_1$ may be defined as an average of Euclidean distances between target fingerprint usrFP and fingerprints of other points in overall list P. In an exemplary embodiment, constant $d_1$ may be obtained by dividing a sum of the above-mentioned Euclidean distances by a number of points in overall list P. Exemplary constants $d_2$, $d_3$, and $d_4$ may also be defined so that $d_1 \le d_2 \le d_3 \le d_4$. In an exemplary embodiment, values of $d_2$, $d_3$, $d_4$ may be tuned with respect to $d_1$. For example, $\{d_1, \ldots, d_4\}$ may be set to $\{20, 35, 40, 45\}$. In an exemplary embodiment, if $d_{min} \le d_4$, the estimated location of target user 202 may be calculated based on smallest Euclidean distance $d_{min}$, as described below.

In an exemplary embodiment, calculating the estimated location in step 114 may include returning initial value $\vartheta$ calculated using Equation (8a) as the estimated location responsive to $d_{min} \le d_1$. In an exemplary embodiment, if smallest Euclidean distance $d_{min}$ is smaller than average of Euclidean distances $d_1$, it may be inferred that initial value $\vartheta$ is located close enough to an actual location of target user 202. Therefore, in an exemplary embodiment, step 114 may return $\vartheta$ as the estimated location of target user 202.

In an exemplary embodiment, calculating the estimated location in step 114 may include obtaining the estimated location by applying a weighted k-nearest neighbors (WKNN) method on a first points set responsive to $d_1 \le d_{min} \le d_2$. In an exemplary embodiment, WKNN may refer to a modification of a k-nearest neighbors method in which a different weight is assigned to each of k nearest neighbors of an input point. An exemplary first points set may include respective points of the plurality of neighboring points that are located in a circle with a radius $R_2$ centered at the initial value where $R_2 < R_1$. In an exemplary embodiment, if $d_1 \le d_{min} \le d_2$, it may be inferred that initial value $\vartheta$ is located in a region close enough to target user 202 so that the target user's location may be estimated based on neighboring locations of initial value $\vartheta$, i.e., the first points set.

In an exemplary embodiment, calculating the estimated location in step 114 may include obtaining the estimated location by applying the WKNN method on a second points set responsive to $d_2 \le d_{min} \le d_3$. An exemplary second points set may include respective points of the plurality of neighboring points that are located inside respective boundaries of respective clusters in clusters set $\mathcal{Z}$. As mentioned above, an exemplary boundary of a cluster may include a smallest rectangle containing the cluster. Therefore, in an exemplary embodiment, if $d_2 \le d_{min} \le d_3$, initial value $\vartheta$ may be close enough to clusters in clusters set $\mathcal{Z}$ that points in cluster boundaries (i.e., the second points set) may be utilized for estimating the location of target user 202.

In an exemplary embodiment, calculating the estimated location in step 114 may include obtaining the estimated location by applying the WKNN method on a third points set responsive to $d_3 \le d_{min} \le d_4$. An exemplary third points set may include respective points of the plurality of neighboring points that are located in circles with a radius $R_3$ centered at each point in the convex hulls list. In an exemplary embodiment, if $d_3 \le d_{min} \le d_4$, it may be inferred that initial value $\vartheta$ of target user's location may be close enough to clusters in $\mathcal{Z}$ so that clusters' convex hulls (i.e., the third points set) may be utilized for estimating the location of target user 202.

In an exemplary embodiment, if $d_4 \le d_{min}$, it may be inferred that the target user's location may not be estimated based on clusters in clusters set $\mathcal{Z}$ since target user 202 may have entered a new area which may be different from areas visited by target user 202 in previous activities of the user. Therefore, in an exemplary embodiment, step 112 may determine the one or more target clusters may not satisfy the localization condition. If, in an exemplary embodiment, the one or more target clusters have been replaced with the one or more substitute clusters, it may be determined in step 116 that none of the plurality of clusters in the database may be useful for estimating the target user's location. Therefore, in an exemplary embodiment, method 100 may proceed to step 118 to obtain the estimated location of target user 202 based on the plurality of observations lists stored in the database.

Figure 1E:
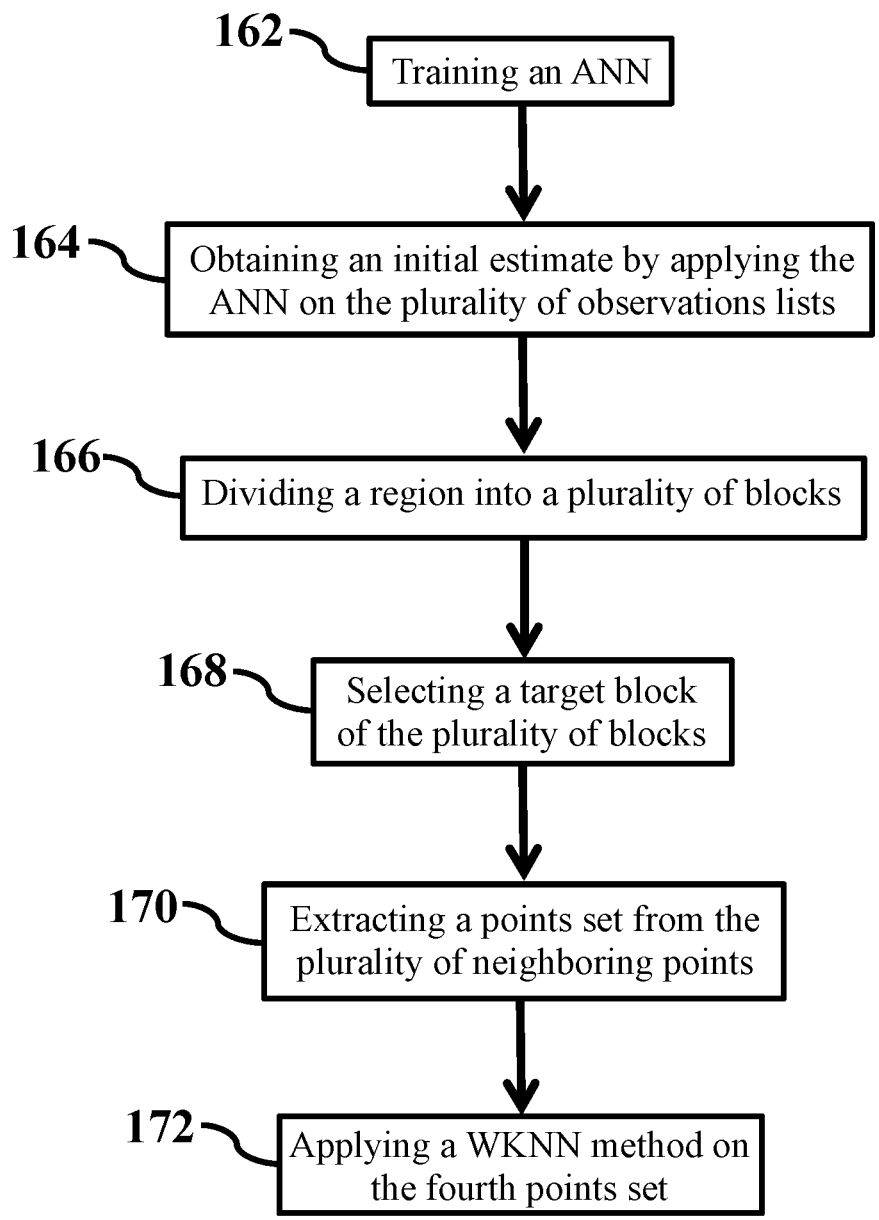
FIG. 1E shows a flowchart for obtaining an estimated location based on a plurality of observations lists, consistent with one or more exemplary embodiments of the present disclosure.

For further detail with respect to step 118, FIG. 1E shows a flowchart for obtaining an estimated location based on a plurality of observations lists, consistent with one or more exemplary embodiments of the present disclosure. In an exemplary embodiment, obtaining the estimated location based on the plurality of observations lists in step 118 may include training a deep neural network (DNN) based on data stored in the database (step 162), obtaining an initial estimate of the target user's location by applying the DNN on the plurality of observations lists (step 164), dividing a region containing the plurality of neighboring points into a plurality of blocks (step 166), selecting a target block of the plurality of blocks (step 168), extracting a fourth points set from the plurality of neighboring points (step 170), and obtaining the estimated location by applying the WKNN method on the fourth points set (step 172).

Figure 6:
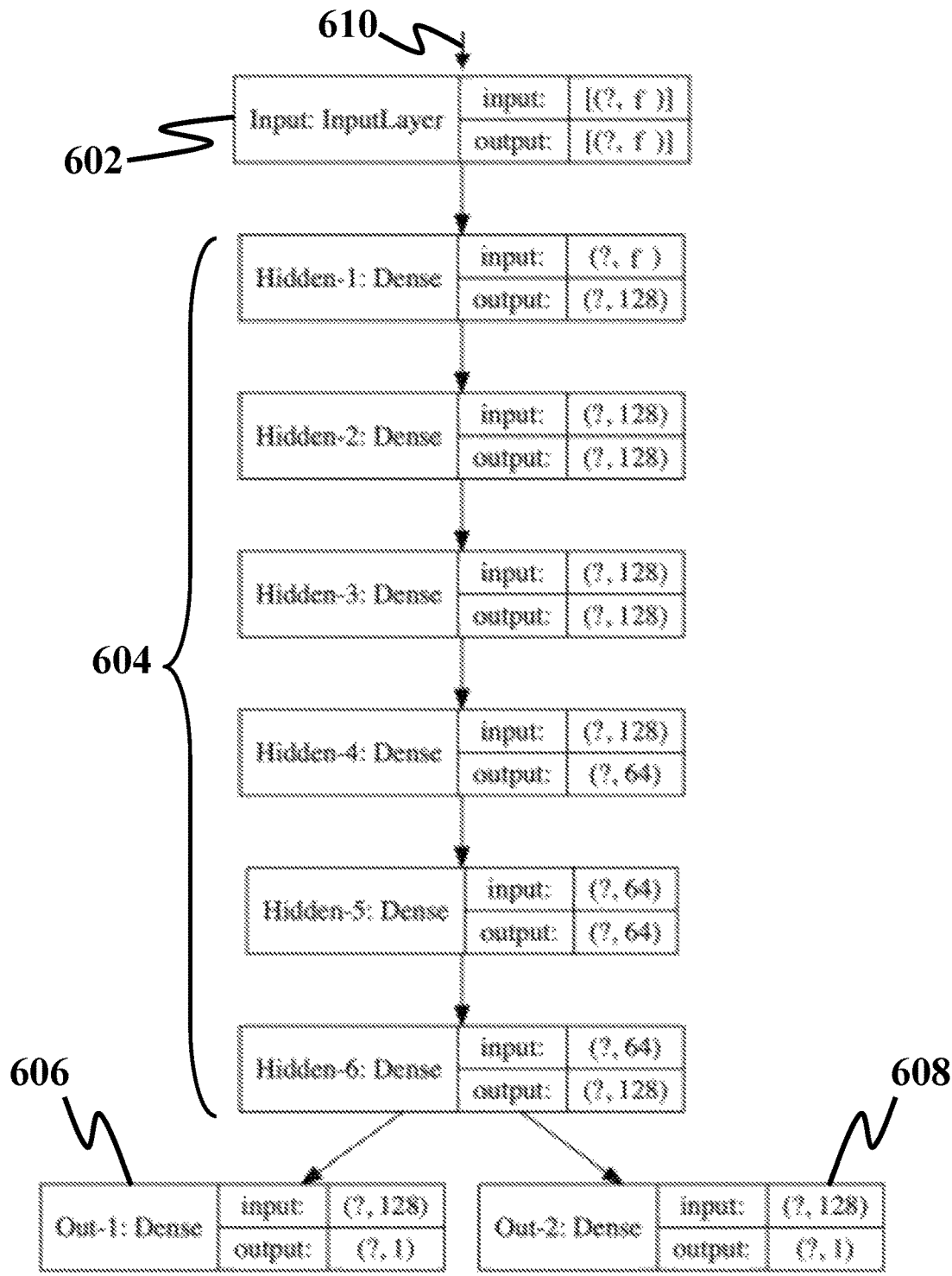
FIG. 6 shows a block diagram of a deep neural network, consistent with one or more exemplary embodiments of the present disclosure.

In further detail with regards to step 162, FIG. 6 shows a block diagram of a deep neural network, consistent with one or more exemplary embodiments of the present disclosure. In an exemplary embodiment, step 162 may include training a DNN 600 based on data stored in the database. In an exemplary embodiment, DNN 600 may include of an input layer 602 followed by six hidden layers 604 and two outputs 606 and 608 to simultaneously predict x and y labels of the target user's location, respectively. Exemplary dropout (about 30%) and batch-normalization layers may exist between successive hidden layers that are not shown in the FIG. 6 for simplicity. In an exemplary embodiment, there may be about 5% dropout layer for an input 610 so that DNN 600 may robust against unidentified APs (an overall accuracy may be increased about 6%). An exemplary activation function used in all layers may be a rectified linear unit (ReLU) except for outputs in which a linear activation function may be used. In an exemplary embodiment, DNN 600 may have a simple yet effective architecture.

In an exemplary embodiment, fingerprints of each observation in the plurality of observations lists may be extracted from offline data stored in the database prior to training DNN 600. Exemplary fingerprints may be converted to normalized vectors by dividing values of each fingerprint by a minimum RSS threshold (for example, −120 dB). Next, each exemplary RSS vector may be converted to a feature vector consisting of RSS differences of each pair of APs of the plurality of APs. In an exemplary embodiment, normalized vectors may lead to about 7% higher accuracy compared to raw RSS vectors.

Exemplary feature vectors may be fed to DNN 600 for training the network. In an exemplary embodiment, DNN 600 may fit the training data with 75 epochs using a stochastic gradient descent as an optimizer and a mean squared error as a loss function. An exemplary learning rate may be set to 0.0001.

In an exemplary embodiment, step 164 may include obtaining the initial estimate of the location of target user 202 by applying DNN 600 on the plurality of observations lists. In an exemplary embodiment, neighboring observations in the plurality of observations lists may be converted to feature vectors (similar to the training phase in step 162) to be fed to DNN 600. In an exemplary embodiment, DNN 600 may provide outputs 606 and 608 as x and y coordinates of the initial estimate with a precision of a few meters that may be enhanced in subsequent steps described below.

In an exemplary embodiment, step 166 may include dividing a region that contains the plurality of neighboring points into a plurality of blocks. Sizes of exemplary plurality of blocks may be set larger than an expected output precision of step 164. For example, if it is expected to obtain an initial estimate with a precision of a few meters at outputs 606 and 608, each block size may be set to about 10 m×10 m. As a result, in an exemplary embodiment, a target block may be selected in step 168 from the plurality of blocks that may contain the initial estimate. In an exemplary embodiment, coordinates of a center of each block (that may be obtained from the database according to the region size and location) may be compared with outputs 606 and 608. An exemplary block that may have a closest center to the initial estimate may be selected as the target block.

In an exemplary embodiment, step 170 may include extracting a fourth points set from the plurality of neighboring points. An exemplary fourth points set may include points in the target block. Finally, an exemplary WKNN method may be applied on the fourth points set in step 172 to obtain the estimated location.

WKNN is a popular method that has been widely used in a final stage of several studies. Neighbors of the WKNN method are usually calculated based on the Euclidean distance of RSS vectors, which may be noisy. Therefore, there may be neighbors in an input of WKNN that are close together in terms of RSS values, but may be far regarding their physical (x,y) locations. As a result, in an exemplary embodiment, before applying the WKNN method, furthest observations may be removed.

Figure 1F:
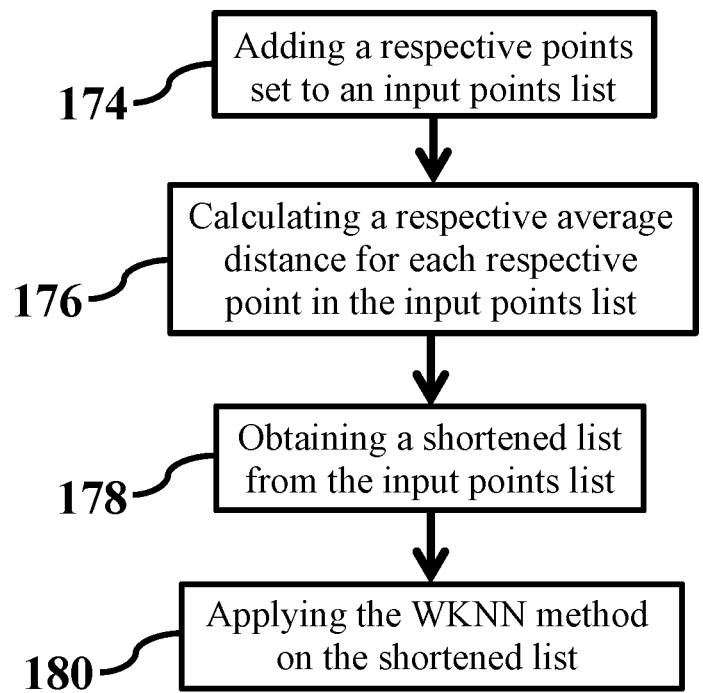
FIG. 1F shows a flowchart for applying a weighted k-nearest neighbors (WKNN) method, consistent with one or more exemplary embodiments of the present disclosure.

FIG. 1F shows a flowchart for applying a weighted k-nearest neighbors (WKNN) method??, consistent with one or more exemplary embodiments of the present disclosure. In an exemplary embodiment, applying the WKNN method on each of the first points set, the second points set, the third points set, and the fourth points set may include adding a respective set of the first points set, the second points set, the third points set, and the fourth points set to an input points list (step 174), calculating a respective average distance of a plurality of average distances for each respective point in the input points list (step 176), obtaining a shortened list from the input points list (step 178), and applying the WKNN method on the shortened list (step 180).

In an exemplary embodiment, step 174 may add either the first points set, the second points set, or the third points set to the input points list in step 174 (based on the conditions discussed in step 114) if the WKNN method is to be executed in step 114. If, in an exemplary embodiment, the WKNN method is to be executed in step 172, the fourth points set may be added the input points list in step 174.

In an exemplary embodiment, step 176 may include calculating a respective average distance for each respective point in the input points list. In an exemplary embodiment, a different average distance may be calculated for each point in the input points list by averaging Euclidean distances between each point and each of remaining points in the input points list.

In an exemplary embodiment, step 178 may include obtaining a shortened list by removing each respective point that is associated with a respective average distance that is shorter than a distance threshold from the input points list. To remove an exemplary point from the input points list, an average distance that is obtained for the exemplary point in step 176 may be compared with an exemplary distance threshold. In an exemplary embodiment, if the average distance of a point is shorter than the distance threshold, that point may be removed from the input points list. An exemplary distance threshold may be selected empirically based on obtained values of average distances. For example, 0.9 of a highest average distance obtained in step 176 may be selected as a distance threshold.

In an exemplary embodiment, after obtaining the shortened list in step 178, a conventional WKNN method may be applied on points in the shortened list in step 180. An exemplary output of the WKNN method may include the estimated location of target user 202. Referring again to FIG. 1A, in an exemplary embodiment, the estimated location may be stored in the database in step 120 along with other obtained data (such as clusters, observations, etc.) for target user 202 to be used in future executions of method 100 for localization of target user 202 or possibly other users of plurality of users 204. An exemplary database may be implemented on a computer memory or other data storage devices.

In an exemplary embodiment, APs that may be visible throughout different executions of method 100 may change. Some exemplary APs may be added whereas others may be removed. In an exemplary embodiment, AP changes may have to be taken into account to maintain positioning accuracy of method 100.

Figure 1G:
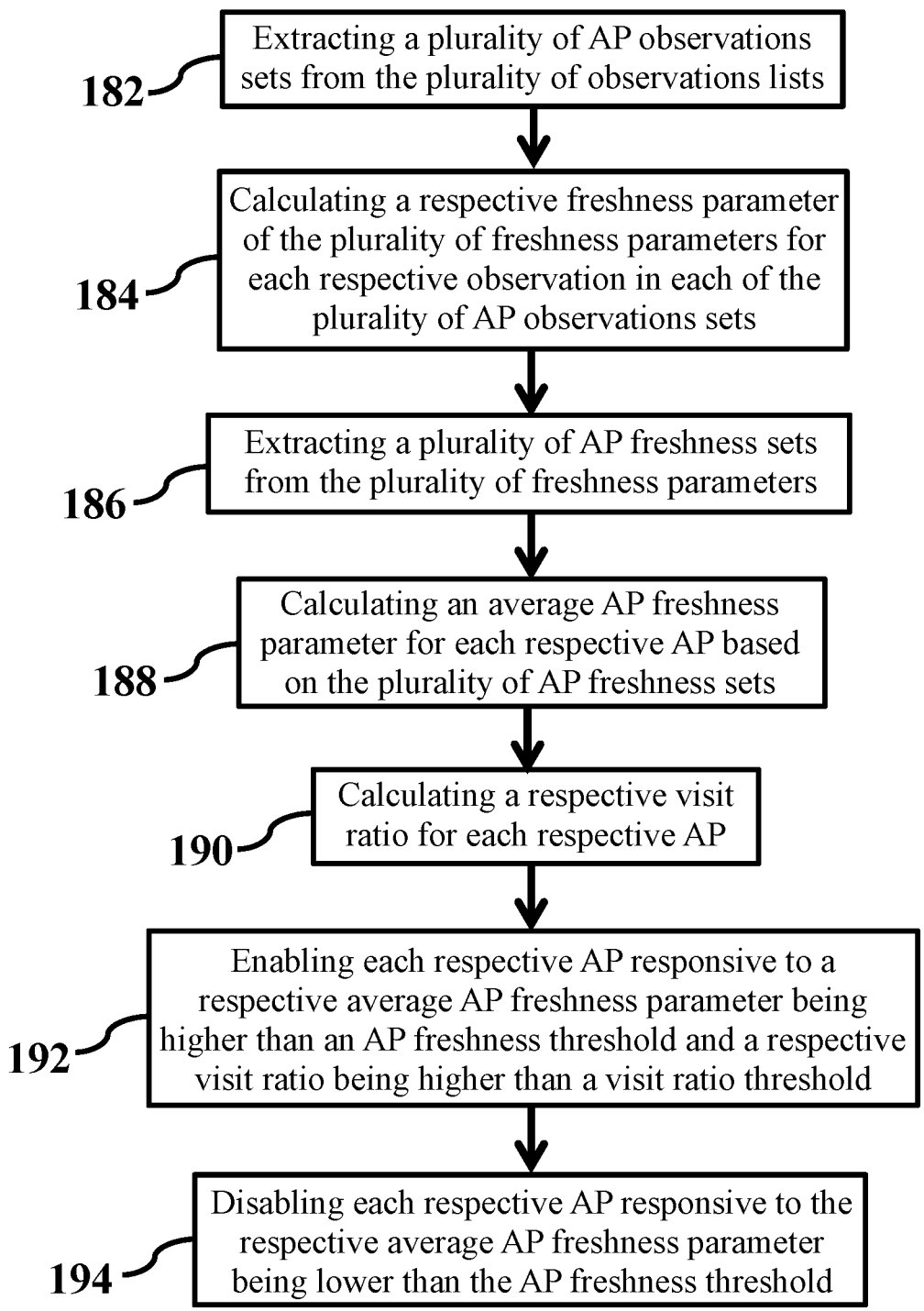
FIG. 1G shows a flowchart for updating an access points (APs) list, consistent with one or more exemplary embodiments of the present disclosure.
Figure 1H:
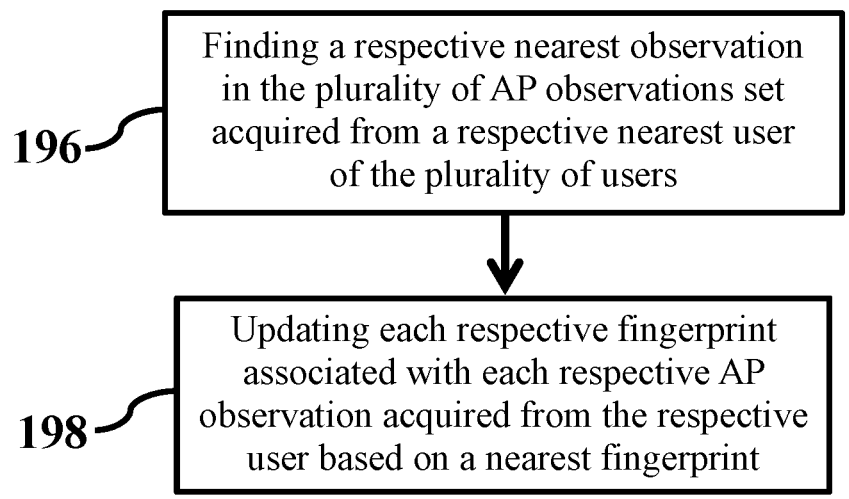
FIG. 1H shows a flowchart for updating an AP observation, consistent with one or more exemplary embodiments of the present disclosure.

In an exemplary embodiment, method 100 may further include updating each of the plurality of APs lists. FIG. 1G shows a flowchart for updating an access points (APs) list, consistent with one or more exemplary embodiments of the present disclosure. In an exemplary embodiment, updating each of the plurality of APs lists may include extracting a plurality of AP observations sets from the plurality of observations lists (step 182), calculating a respective freshness parameter of the plurality of freshness parameters for each respective observation in each of the plurality of AP observations sets (step 184), extracting a plurality of AP freshness sets from the plurality of freshness parameters (step 186), calculating an average AP freshness parameter of a plurality of average AP freshness parameters for each respective AP of the plurality of APs (step 188), calculating a visit ratio of a plurality of visit ratios for each respective AP of the plurality of APs (step 190), enabling each respective AP of the plurality of APs responsive to a respective average AP freshness parameter of the plurality of average AP freshness parameters being higher than an AP freshness threshold and a respective visit ratio of the plurality of visit ratios being higher than a visit ratio threshold (step 192), and disabling the each respective AP responsive to the respective average AP freshness parameter being lower than the AP freshness threshold (step 194).

In an exemplary embodiment, step 182 may include extracting a plurality of AP observations sets from the plurality of observations lists. In an exemplary embodiment, each respective AP observations set of the plurality of AP observations sets may include observations (similar to target observation 200) that are acquired from each of plurality of users 204 by a respective AP of the plurality of APs.

In an exemplary embodiment, step 184 may include calculating a respective freshness parameter for each respective observation. In an exemplary embodiment, a separate freshness parameter may be calculated using Equation (3) for each different observation based on a visit-time of each observation. An exemplary visit-time may be obtained for each exemplary observation by recording am acquisition time of each exemplary observation in each of the plurality of AP observations sets.

In an exemplary embodiment, step 186 may include extracting the plurality of AP freshness sets from the plurality of freshness parameters. In an exemplary embodiment, each respective freshness parameter in each respective AP freshness set of the plurality of AP freshness sets may be associated with a respective observation in a respective AP observations set of the plurality of AP observations sets. Therefore, in an exemplary embodiment, each AP freshness set may include freshness parameters that are calculated for observations that include an RSS value acquired from a corresponding visible AP of the plurality of APs. As a result, in an exemplary embodiment, freshness of each AP may be evaluated based on a corresponding freshness set obtained for that AP.

In an exemplary embodiment, calculating the average AP freshness parameter for a respective AP in step 188 may include averaging respective freshness parameters in a respective AP freshness set of the plurality of AP freshness sets. Therefore, in an exemplary embodiment, a distinct average AP freshness parameter may be calculated for each different AP. An exemplary average AP freshness parameter may demonstrate a freshness level of a corresponding AP.

In an exemplary embodiment, step 190 may include calculating a visit ratio $\mu$ for each respective AP according to an operation defined by the following:

$$\mu = \frac{|totalVisits|}{\Phi} \quad \text{Equation (9)}$$

where |totalVisits| is a number of users of plurality of users 204 that are associated with at least one observation in a respective AP observations set and $\Phi$ is a number of users of plurality of users 204 that are associated with at least a predefined number of observations in the plurality of AP observations sets. In an exemplary embodiment, |totalVisits| may show a number of unique users that have recently visited a corresponding AP, i.e., received an RSS value higher than the minimum RSS threshold. In an exemplary embodiment, $\Phi$ may show a number of active users in a region of interest inside an indoor location. A threshold of a user activity may be determined by an exemplary predefined number of observations. In an exemplary embodiment, the predefined number of observations may be set to different values for different regions based on an expected number of users that may visit each region. In an exemplary embodiment, the predefined number of observations may be set to higher values for crowded regions than for less populated regions.

In an exemplary embodiment, an AP may be enabled in step 192 if a corresponding average AP freshness parameter of the AP (calculated in step 188) is higher than an AP freshness threshold and also a corresponding visit ratio of the AP (calculated in step 190) is higher than a visit ratio threshold. A value of an exemplary AP freshness threshold may be determined based on an expected observation rate of an AP in a particular region. In an exemplary embodiment, the AP freshness threshold may be set to higher values in areas that more frequent user visits may be expected. A value of an exemplary visit ratio threshold may be determined based on an expected number of users that may visit a particular region. In an exemplary embodiment, the visit ratio threshold may be set to higher values in areas that are expected to be visited by a higher number of users. Therefore, in an exemplary embodiment, a number and frequency of observations may have to exceed certain thresholds for a particular AP to be enabled. In an exemplary embodiment, enabling each respective AP of the plurality of APs may include adding each respective AP to each respective APs list of the plurality of APs list. As a result, once an exemplary AP is enabled, an RSS value that is sent from the AP may be utilized for localization in method 100.

In an exemplary embodiment, an AP may be disabled in step 194 if a corresponding average AP freshness parameter of the AP (calculated in step 188) becomes lower than the AP freshness threshold. In an exemplary embodiment, disabling each respective AP may include removing each respective AP from each respective APs list. As a result, if an exemplary AP is not observed by plurality of users 204 for longer than a given period of time, its RSS may be excluded from localization processes in method 100.

In an exemplary embodiment, method 100 may further include updating each respective AP observation in the plurality of AP observations sets that are acquired from a respective user of plurality of users 204. FIG. 1I1 shows a flowchart for updating an AP observation, consistent with one or more exemplary embodiments of the present disclosure. In an exemplary embodiment, updating each respective AP observation may include finding a respective nearest observation in the plurality of AP observations set acquired from a respective nearest user of the plurality of users (step 196) and updating each respective fingerprint associated with each respective AP observation acquired from the respective user based on a nearest fingerprint associated with the respective nearest observation (step 198). Steps 196 and 198 are discussed below for target user 202. However, in an exemplary embodiment, they may be similarly applied to any user of plurality of users 204 to update different AP observations that may have been acquired from different users of plurality of users 204.

In an exemplary embodiment, step 196 may include finding a nearest observation in the plurality of AP observations set. In an exemplary embodiment, the nearest observation may refer to an observation that may be acquired from a nearest user of plurality of users 204 to target user 202. An exemplary nearest user may be located at a nearest location to target user 204, i.e., in an exemplary embodiment, a Euclidean distance between a (x,y) label of the nearest user and location 206 may be shorter than a Euclidean distance between a (x,y) label of any other user of plurality of users 204 and location 206.

In an exemplary embodiment, step 198 may include updating fingerprint 208 based on a nearest fingerprint that may be associated with the nearest observation. An exemplary nearest fingerprint may refer to a fingerprint of the nearest user that may have a shortest Euclidean distance to the fingerprint 208 among fingerprints associated with the nearest user. In an exemplary embodiment, numerous observations may have been acquired from the nearest user during different executions of method 100 (even at a same location at different moments) and may have been stored in the database. Therefore, in an exemplary embodiment, only one of the fingerprints that may have been acquired from the nearest user may have a smallest Euclidean distance (in terms of RSS values) to target fingerprint 208. In an exemplary embodiment, if the nearest fingerprint includes a new RSS value with respect to target fingerprint 208, the new RSS value may be added to a new element of target fingerprint 208 (similar to row 304 of fingerprint 300 in FIG. 3). In an exemplary embodiment, an existing RSS value in target fingerprint 208 may be updated by being averaged with a corresponding RSS value of the nearest fingerprint.

Figure 7:
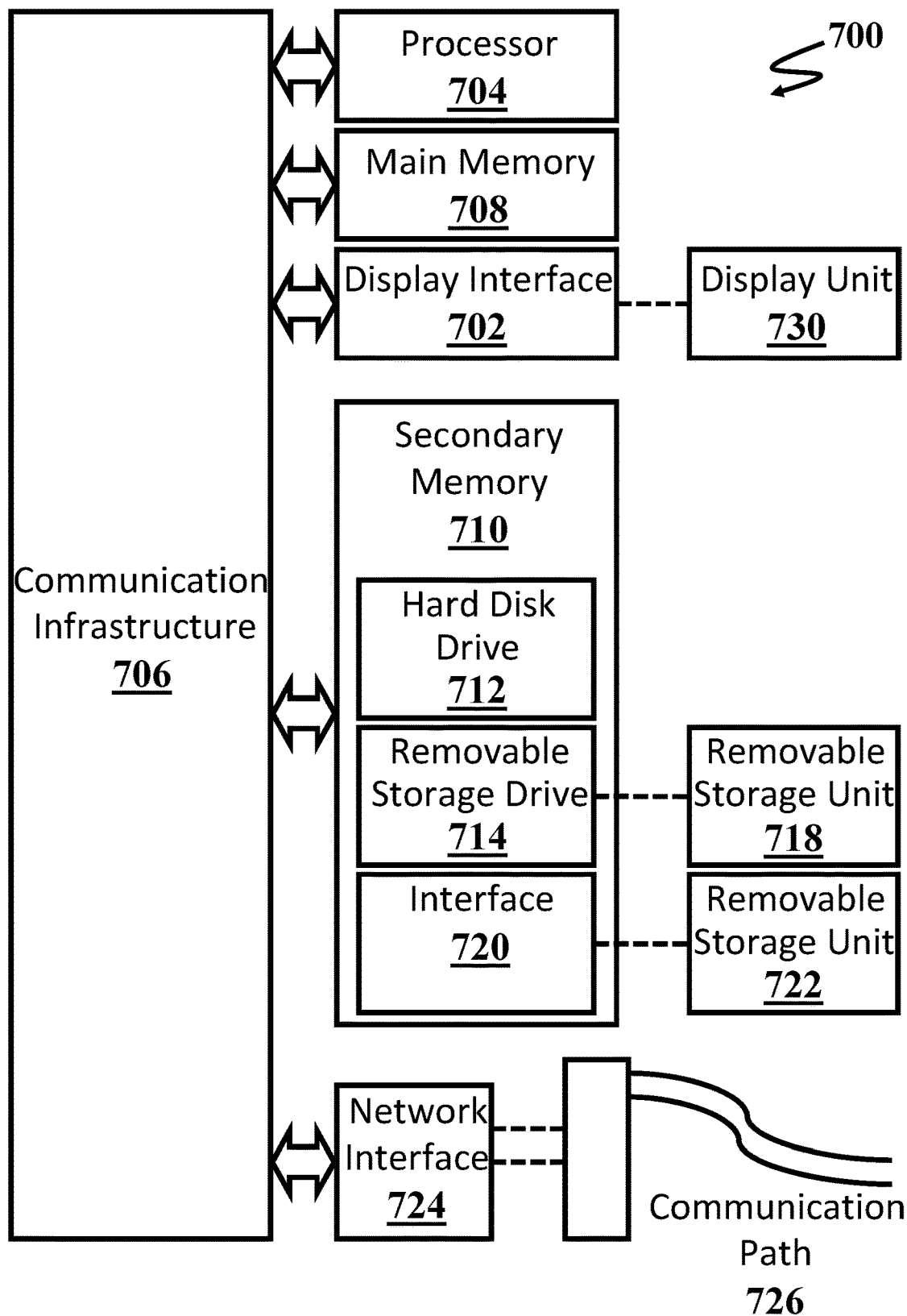
FIG. 7 shows an example computer system in which an embodiment of the present invention, or portions thereof, may be implemented as computer-readable code, consistent with exemplary embodiments of the present disclosure.

FIG. 7 shows an example computer system 700 in which an embodiment of the present invention, or portions thereof, may be implemented as computer-readable code, consistent with exemplary embodiments of the present disclosure. For example, method 100 may be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-6.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 704 may be a special purpose or a general-purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 may be connected to a communication infrastructure 706, for example, a bus, message queue, network, or multi-core message-passing scheme.

In an exemplary embodiment, computer system 700 may include a display interface 702, for example a video connector, to transfer data to a display unit 730, for example, a monitor. Computer system 700 may also include a main memory 708, for example, random access memory (RAM), and may also include a secondary memory 710. Secondary memory 710 may include, for example, a hard disk drive 712, and a removable storage drive 714. Removable storage drive 714 may include a floppy disk drive, a magnetic tape drive, an optical disk drive, a flash memory, or the like. Removable storage drive 714 may read from and/or write to a removable storage unit 718 in a well-known manner. Removable storage unit 718 may include a floppy disk, a magnetic tape, an optical disk, etc., which may be read by and written to by removable storage drive 714. As will be appreciated by persons skilled in the relevant art, removable storage unit 718 may include a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement different embodiments of the present disclosure as discussed herein. In particular, the computer programs, when executed, enable processor device 704 to implement the processes of the present disclosure, such as the operations in method 100 illustrated by flowcharts of FIG. 1A-FIG. 1I1 discussed above. Accordingly, such computer programs represent controllers of computer system 700. Where an exemplary embodiment of method 100 is implemented using software, the software may be stored in a computer program product and loaded into computer system 700 using removable storage drive 714, interface 720, and hard disk drive 712, or communications interface 724.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for indoor localization based on previous activities, the method comprising:
   acquiring, utilizing a respective access point (AP) of a plurality of APs, a target observation from a target user of a plurality of users;
   adding, utilizing one or more processors, the target observation to a target observations list of a plurality of observations lists associated with the plurality of users, the target observations list comprising a plurality of observations associated with the target user;
   obtaining, utilizing the one or more processors, one or more target clusters of a plurality of clusters for the target user based on the plurality of observations, each of the plurality of clusters associated with a respective user of the plurality of users;
   verifying, utilizing the one or more processors, that the one or more target clusters satisfy a localization condition;
   replacing, utilizing the one or more processors, the one or more target clusters with one or more substitute clusters of the plurality of clusters responsive to the one or more target clusters not satisfying the localization condition, the one or more substitute clusters associated with one or more substitute users of the plurality of users, the one or more substitute users different from the target user;

localizing, utilizing the one or more processors, the target user by obtaining an estimated location of the target user based on the one or more target clusters responsive to the one or more target clusters satisfying the localization condition;

localizing, utilizing the one or more processors, the target user by obtaining the estimated location of the target user based on the plurality of observations lists responsive to the one or more substitute clusters not satisfying the localization condition; and storing, utilizing the one or more processors, the estimated location in a database.

2. The method of claim 1, wherein acquiring the target observation comprises sequentially aggregating elements of a target fingerprint comprising a data vector associated with the target observation by performing an iterative aggregation process, each iteration of the aggregation process comprising:

identifying an APs list of a plurality of APs lists extracted from the plurality of APs by scanning each AP of the APs list at a location of the target user utilizing one or more transceivers, each of the plurality of APs lists associated with a respective observation in the target observations list;

acquiring one or more received signal strength (RSS) values from identified APs in the APs list;

adding one or more elements to the elements of the target fingerprint by loading the one or more RSS values to the one or more elements responsive to the identified APs not being identified in previous iterations of the aggregation process; and updating values of the one or more elements with the one or more RSS values responsive to the identified APs being identified in the previous iterations.

3. The method of claim 2, wherein obtaining the one or more target clusters comprises:

obtaining, utilizing the identified APs, an initial location estimate for the target user, the initial location estimate associated with the target fingerprint;

acquiring, utilizing the identified APs, a plurality of neighboring observations, each of the plurality of neighboring observations associated with a respective neighboring point of a plurality of neighboring points located in a circle with a radius $R_1$ centered at the initial location estimate;

obtaining a respective visit-time of a plurality of visit-times for each respective neighboring observation of the plurality of neighboring observations by recording a respective acquisition time of each respective neighboring observation of the plurality of neighboring observations;

calculating a respective freshness parameter of a plurality of freshness parameters for each respective neighboring observation of the plurality of neighboring observations based on a respective visit-time of the plurality of visit-times;

selecting a starting point from the plurality of neighboring points, the starting point satisfying a clustering condition;

adding the starting point to a total-visited list and a queue;

generating a target cluster of the one or more target clusters by repeating a clustering method until the queue becomes empty; and generating a convex hull of a convex hulls list associated with the one or more target clusters based on a shape of the target cluster, the convex hull comprising points of a smallest convex set containing the shape of the target cluster.

4. The method of claim 3, wherein repeating the clustering method comprises repeating an iterative method, each iteration of the iterative method comprising:

obtaining a plurality of neighboring locations by acquiring each respective location of each respective neighboring observation of the plurality of neighboring observations, each of the plurality of neighboring locations satisfying a neighboring condition;

adding the plurality of neighboring locations to the total-visited list;

assigning a respective visit-time of the plurality of visit-times to each respective neighboring location of the plurality of neighboring locations according to each respective neighboring observation of the plurality of neighboring observations;

extracting a freshness list from the plurality of freshness parameters, each freshness parameter in the freshness list associated with a respective visit-time of the plurality of visit-times;

obtaining an average freshness by calculating an average of freshness parameters in the freshness list;

adding the plurality of neighboring locations to the queue and the target cluster responsive to:
  a number of the plurality of neighboring locations being larger than a density threshold; and
  the average freshness being larger than a freshness threshold;

adding the starting point to an expanders list responsive to the plurality of neighboring locations being added to the queue;

removing the starting point from the queue; and replacing the starting point with a remaining point in the queue responsive to the queue not being empty.

5. The method of claim 4, further comprising compression of the target cluster by removing an oldest neighboring location of the plurality of neighboring locations from the plurality of neighboring locations responsive to:

the oldest neighboring location not being added to the expanders list;

a number of the plurality of neighboring locations remaining larger than the density threshold after removing the oldest neighboring location; and the average freshness remaining larger than the freshness threshold after removing the oldest neighboring location, wherein the oldest neighboring location is associated with a smallest freshness parameter in the freshness list.

6. The method of claim 3, wherein obtaining the estimated location based on the one or more target clusters comprises:

merging the expanders list and the convex hulls list into an overall list P;

calculating an initial value $\vartheta$ of the estimated location according to a set of operations defined by the following:

$$\vartheta = \min_{p \in P} ED(usrFP, p)$$

-continued $$d_{min} = ED(\vartheta, usrFP)$$

where:
ED(usrFP,p) is a Euclidean distance between the target fingerprint usrFP and a fingerprint p associated with a respective point in the overall list P and comprising respective RSS values acquired from the identified APs in the APs list, and $$\min_{p \in P}$$

returns a point in the overall list P that corresponds to a smallest Euclidean distance $d_{min}$ associated with the initial value $\vartheta$;
    defining a constant $d_1$ as an average of Euclidean distances between the target fingerprint usrFP and fingerprints associated with respective points in the overall list P;
    defining a constant $d_2$, a constant $d_3$, and a constant $d_4$ where $d_1 \leq d_2 \leq d_3 \leq d_4$; and
    calculating the estimated location based on the smallest Euclidean distance $d_{min}$ responsive to a condition according to $d_{min} \leq d_4$ being satisfied.

7. The method of claim 6, wherein verifying that the one or more target clusters satisfy the localization condition comprises:
    calculating a respective rank in a ranks set E for each of the one or more target clusters; and
    obtaining a clusters set $\mathcal{Z}$ according to an operation defined by the following:

$$\mathcal{Z} = \{c | c \in E, \gamma - \delta \leq c_{rank} \leq \gamma\} \cup \{\hbar\}$$

where:
    $\mathcal{Z}$ comprises clusters that satisfy the localization condition,
    $\gamma$ is a highest rank in the ranks set E,
    $\hbar$ is a cluster among the one or more target clusters with the highest rank $\gamma$,
    c is a rank in the ranks set E corresponding to a cluster of the one or more target clusters that satisfy the localization condition, and
    $\delta$ is a lower limit of a rank difference for satisfying the localization condition.

8. The method of claim 7, wherein calculating the estimated location comprises:
    responsive to $d_{min} \leq d_1$, returning the initial value $\vartheta$ as the estimated location;
    responsive to $d_1 \leq d_{min} \leq d_2$, obtaining the estimated location by applying a weighted k-nearest neighbors (WKNN) method on a first points set comprising respective points of the plurality of neighboring points that are located in a circle with a radius $R_2$ centered at the initial value $\vartheta$ where $R_2 < R_1$;
    responsive to $d_2 \leq d_{min} \leq d_3$, obtaining the estimated location by applying the WKNN method on a second points set comprising respective points of the plurality of neighboring points that are located inside respective boundaries of respective clusters in the clusters set $\mathcal{Z}$, each respective boundaries of a respective cluster in the clusters set $\mathcal{Z}$ comprising a smallest rectangle containing the respective cluster; and
    responsive to $d_3 \leq d_{min} \leq d_4$, obtaining the estimated location by applying the WKNN method on a third points set comprising respective points of the plurality of neighboring points that are located in circles with a radius $R_3$ centered at each point in the convex hulls list.

9. The method of claim 8, wherein obtaining the estimated location based on the plurality of observations lists comprises:
    training a deep neural network (DNN) based on data stored in the database;
    obtaining an initial estimate of the target user's location by applying the DNN on the plurality of observations lists;
    dividing a region containing the plurality of neighboring points into a plurality of blocks;
    selecting a target block of the plurality of blocks, the target block containing the initial estimate;
    extracting a fourth points set from the plurality of neighboring points, the fourth points set comprising points in the target block; and
    obtaining the estimated location by applying the WKNN method on the fourth points set.

10. The method of claim 9, wherein applying the WKNN method on each of the first points set, the second points set, the third points set, and the fourth points set comprises:
    adding a respective set of the first points set, the second points set, the third points set, and the fourth points set to an input points list;
    calculating a respective average distance of a plurality of average distances for each respective point in the input points list by averaging Euclidean distances between each respective point and each of remaining points in the input points list;
    obtaining a shortened list by removing each respective point associated with a respective average distance of the plurality of average distances that is shorter than a distance threshold from the input points list; and
    applying the WKNN method on the shortened list.

11. The method of claim 7, wherein calculating the respective rank in the ranks set E comprises:
    calculating a weighted access point ratio (WAPR) according to an operation defined by the following:

$$WAPR \frac{\sum_{i=1}^{k_1} T(av_i, uv_i)}{k_1}$$

where:
    $k_1$ is a number of elements of the APs list,
    $uv_i$ is an RSS value acquired by an $i^{th}$ AP in the APs list where $1 \leq i \leq k_1$,
    $av_i$ is an average of RSS values acquired by the $i^{th}$ AP in each of the plurality APs lists, and
    $T(av_i, uv_i)$ is a function defined by the following:

$$T(av_i, uv_i) = 1 - \frac{|av_i - uv_i|}{|\varepsilon|}$$

where $\varepsilon$ is a minimum threshold of RSS values; and
    obtaining the respective rank by calculating a weighted average of the WAPR and the average freshness.

12. The method of claim 3, further comprising updating, utilizing the one or more processors, each of the plurality of APs lists by:
    extracting a plurality of AP observations sets from the plurality of observations lists, each respective AP observations set of the plurality of AP observations sets comprising observations acquired from each of the plurality of users by a respective AP of the plurality of APs;

calculating a respective freshness parameter of the plurality of freshness parameters for each respective observation in each of the plurality of AP observations sets;

extracting a plurality of AP freshness sets from the plurality of freshness parameters, each respective freshness parameter in each respective AP freshness set of the plurality of AP freshness sets associated with a respective observation in a respective AP observations set of the plurality of AP observations sets;

calculating an average AP freshness parameter of a plurality of average AP freshness parameters for each respective AP of the plurality of APs by averaging respective freshness parameters in a respective AP freshness set of the plurality of AP freshness sets;

calculating a visit ratio μ of a plurality of visit ratios for each respective AP of the plurality of APs according to an operation defined by the following:

$$\mu = \frac{|totalVisits|}{\Phi}$$

where:
|totalVisits| is a number of users of the plurality of users that are associated with at least one observation in the respective AP observations set; and
Φ is a number of users of the plurality of users that are associated with at least a predefined number of observations in the plurality of AP observations sets;

enabling each respective AP of the plurality of APs by adding each respective AP to each respective APs list of the plurality of APs list responsive to:
a respective average AP freshness parameter of the plurality of average AP freshness parameters being higher than an AP freshness threshold; and
a respective visit ratio of the plurality of visit ratios being higher than a visit ratio threshold; and disabling the each respective AP by removing the each respective AP from the each respective APs list responsive to the respective average AP freshness parameter being lower than the AP freshness threshold.

13. The method of claim 12, further comprising, utilizing the one or more processors, updating each respective AP observation in the plurality of AP observations sets acquired from a respective user of the plurality of users by:

finding a respective nearest observation in the plurality of AP observations set acquired from a respective nearest user of the plurality of users, the respective nearest user located at a nearest location to the respective user; and updating each respective fingerprint associated with each respective AP observation acquired from the respective user based on a nearest fingerprint associated with the respective nearest observation, the nearest fingerprint comprising a shortest Euclidean distance to the each respective fingerprint among fingerprints associated with the respective nearest user.

14. The method of claim 12, wherein calculating a respective freshness parameter for each respective neighboring observation of the plurality of neighboring observations or each respective observation in each of the plurality of AP observations sets comprises calculating a freshness parameter G(x) for an observation x according to an operation defined by the following:

$$G(x) = \max\left(\frac{stime - \beta*(stime - x_{visitTime})}{stime}, 1\right)$$

where:
stime is a moment of calculating the freshness parameter G(x),
β is a scaling constant,
$x_{visitTime}$ is a respective visit-time associated with the observation x, and
max returns a largest value of given arguments.

15. The method of claim 3, wherein satisfying the clustering condition comprises not being added to the total-visited list.

16. The method of claim 3, wherein satisfying the neighboring condition comprises:
being located in a circle with a radius R centered at the starting point where $R<R_1$; and
not being added to the total-visited list.

17. A system for indoor localization based on previous activities, the system comprising:
a plurality of access points (APs);
one or more transceivers associated with a plurality of users;
a memory having processor-readable instructions stored therein; and
one or more processors configured to access the memory and execute the processor-readable instructions, which, when executed by the processor configures the one or more processors to perform a method, the method comprising:
acquiring, utilizing a respective AP of the plurality of APs, a target observation from a target user of the plurality of users by sequentially aggregating elements of a target fingerprint comprising a data vector associated with the target observation by performing an iterative aggregation process, each iteration of the aggregation process comprising:
identifying an APs list of a plurality of APs lists extracted from the plurality of APs by scanning each AP of the APs list at a location of the target user utilizing the one or more transceivers, each of the plurality of APs lists associated with a respective observation in the target observations list;
acquiring one or more received signal strength (RSS) values from identified APs in the APs list;
adding one or more elements to the elements of the target fingerprint by loading the one or more RSS values to the one or more elements responsive to the identified APs not being identified in previous iterations of the aggregation process; and
updating values of the one or more elements with the one or more RSS values responsive to the identified APs being identified in the previous iterations;
adding the target observation to a target observations list of a plurality of observations lists associated with the plurality of users, the target observations list comprising a plurality of observations associated with the target user;
obtaining one or more target clusters of a plurality of clusters for the target user based on the plurality of observations, each of the plurality of clusters associated with a respective user of the plurality of users;
verifying that the one or more target clusters satisfy a localization condition by:
calculating a respective rank in a ranks set E for each of the one or more target clusters; and
obtaining a clusters set $\mathcal{Z}$ according to an operation defined by the following:

$$\mathcal{Z} = \{c | c \in E, \gamma - \delta \leq c_{rank} \leq \gamma\} \cup \{\hbar\}$$

where:
$\mathcal{Z}$ comprises clusters that satisfy the localization condition,
$\gamma$ is a highest rank in the ranks set E,
$\hbar$ is a cluster among the one or more target clusters with the highest rank $\gamma$,
c is a rank in the ranks set E corresponding to a cluster of the one or more target clusters that satisfy the localization condition, and
$\delta$ is a lower limit of a rank difference for satisfying the localization condition;
replacing the one or more target clusters with one or more substitute clusters of the plurality of clusters responsive to the one or more target clusters not satisfying the localization condition, the one or more substitute clusters associated with one or more substitute users of the plurality of users, the one or more substitute users different from the target user;
localizing the target user by obtaining an estimated location of the target user based on the one or more target clusters responsive to the one or more target clusters satisfying the localization condition;
localizing the target user by obtaining the estimated location of the target user based on the plurality of observations lists responsive to the one or more substitute clusters not satisfying the localization condition; and
storing the estimated location in a database.

18. The system of claim 17, wherein obtaining the one or more target clusters comprises:
obtaining, utilizing the identified APs, an initial location estimate for the target user, the initial location estimate associated with the target fingerprint;
acquiring, utilizing the identified APs, a plurality of neighboring observations, each of the plurality of neighboring observations associated with a respective neighboring point of a plurality of neighboring points located in a circle with a radius $R_1$ centered at the initial location estimate;
obtaining a respective visit-time of a plurality of visit-times for each respective neighboring observation of the plurality of neighboring observations by recording a respective acquisition time of each respective neighboring observation of the plurality of neighboring observations;
calculating a respective freshness parameter G(x) of a plurality of freshness parameters for each respective neighboring observation x of the plurality of neighboring observations based on a respective visit-time of the plurality of visit-times according to an operation defined by the following:

$$G(x) = \max\left(\frac{stime - \beta * (stime - x_{visitTime})}{stime}, 1\right)$$

where:
stime is a moment of calculating the freshness parameter G(x),
$\beta$ is a scaling constant,
$x_{visitTime}$ is a respective visit-time associated with the observation x, and
max returns a largest value of given arguments;
selecting a starting point from the plurality of neighboring points, the starting point not added to a total-visited list;
adding the starting point to the total-visited list and a queue;
generating a target cluster of the one or more target clusters by repeating a clustering method until the queue becomes empty, repeating the clustering method comprising repeating an iterative method, each iteration of the iterative method comprising:
obtaining a plurality of neighboring locations by acquiring each respective location of each respective neighboring observation of the plurality of neighboring observations, each of the plurality of neighboring locations located in a circle with a radius R centered at the starting point where $R < R_1$ and not added to the total-visited list;
adding the plurality of neighboring locations to the total-visited list;
assigning a respective visit-time of the plurality of visit-times to each respective neighboring location of the plurality of neighboring locations according to each respective neighboring observation of the plurality of neighboring observations;
extracting a freshness list from the plurality of freshness parameters, each freshness parameter in the freshness list associated with a respective visit-time of the plurality of visit-times;
obtaining an average freshness by calculating an average of freshness parameters in the freshness list;
adding the plurality of neighboring locations to the queue and the target cluster responsive to:
a number of the plurality of neighboring locations being larger than a density threshold; and
the average freshness being larger than a freshness threshold;
adding the starting point to an expanders list responsive to the plurality of neighboring locations being added to the queue;
removing the starting point from the queue; and
replacing the starting point with a remaining point in the queue responsive to the queue not being empty; and
generating a convex hull of a convex hulls list associated with the one or more target clusters based on a shape of the target cluster, the convex hull comprising points of a smallest convex set containing the shape of the target cluster.

19. The system of claim 18, wherein obtaining the estimated location based on the one or more target clusters comprises:
merging the expanders list and the convex hulls list into an overall list P;
calculating an initial value $\vartheta$ of the estimated location according to a set of operations defined by the following:

$$\vartheta = \min_{p \in P} ED(usrFP, p)$$

-continued $$d_{min} = ED(\vartheta, usrFP)$$

where:
ED(usrFP,p) is a Euclidean distance between the target fingerprint usrFP and a fingerprint p associated with a respective point in the overall list P and comprising respective RSS values acquired from the identified APs in the APs list, and $$\min_{p \in P}$$

returns a point in the overall list P that corresponds to a smallest Euclidean distance $d_{min}$ associated with the initial value $\vartheta$;
  defining a constant $d_1$ as an average of Euclidean distances between the target fingerprint usrFP and fingerprints associated with respective points in the overall list P;
  defining a constant $d_2$, a constant $d_3$, and a constant $d_4$ where $d_1 \leq d_2 \leq d_3 \leq d_4$;
  responsive to $d_{min} \leq d_1$, returning the initial value $\vartheta$ as the estimated location;
  responsive to $d_1 \leq d_{min} \leq d_2$, obtaining the estimated location by applying a weighted k-nearest neighbors (WKNN) method on a first points set comprising respective points of the plurality of neighboring points that are located in a circle with a radius $R_2$ centered at the initial value $\vartheta$ where $R_2 < R_1$;
  responsive to $d_2 \leq d_{min} \leq d_3$, obtaining the estimated location by applying the WKNN method on a second points set comprising respective points of the plurality of neighboring points that are located inside respective boundaries of respective clusters in the clusters set $\mathcal{Z}$, each respective boundaries of a respective cluster in the clusters set $\mathcal{Z}$ comprising a smallest rectangle containing the respective cluster;
  responsive to $d_3 \leq d_{min} \leq d_4$, obtaining the estimated location by applying the WKNN method on a third points set comprising respective points of the plurality of neighboring points that are located in circles with a radius $R_3$ centered at each point in the convex hulls list; and
  responsive to $d_{min} > d_4$:
    training a deep neural network (DNN) based on data stored in the database;
    obtaining an initial estimate of the target user's location by applying the DNN on the plurality of observations lists;
    dividing a region containing the plurality of neighboring points into a plurality of blocks;
    selecting a target block of the plurality of blocks, the target block containing the initial estimate;
    extracting a fourth points set from the plurality of neighboring points, the fourth points set comprising points in the target block; and
    obtaining the estimated location by applying the WKNN method on the fourth points set.

20. The system of claim 19, wherein the method further comprises updating each of the plurality of APs lists by:
  extracting a plurality of AP observations sets from the plurality of observations lists, each respective AP observations set of the plurality of AP observations sets comprising observations acquired from each of the plurality of users by a respective AP of the plurality of APs;
  calculating a respective freshness parameter of the plurality of freshness parameters for each respective observation in each of the plurality of AP observations sets;
  extracting a plurality of AP freshness sets from the plurality of freshness parameters, each respective freshness parameter in each respective AP freshness set of the plurality of AP freshness sets associated with a respective observation in a respective AP observations set of the plurality of AP observations sets;
  calculating an average AP freshness parameter of a plurality of average AP freshness parameters for each respective AP of the plurality of APs by averaging respective freshness parameters in a respective AP freshness set of the plurality of AP freshness sets;
  calculating a visit ratio µ of a plurality of visit ratios for each respective AP of the plurality of APs according to an operation defined by the following:

$$\mu = \frac{|totalVisits|}{\Phi}$$

where:
  |totalVisits| is a number of users of the plurality of users that are associated with at least one observation in the respective AP observations set; and
  $\Phi$ is a number of users of the plurality of users that are associated with at least a predefined number of observations in the plurality of AP observations sets;
  enabling each respective AP of the plurality of APs by adding each respective AP to each respective APs list of the plurality of APs list responsive to:
    a respective average AP freshness parameter of the plurality of average AP freshness parameters being higher than an AP freshness threshold; and
    a respective visit ratio of the plurality of visit ratios being higher than a visit ratio threshold; and
  disabling the each respective AP by removing the each respective AP from the each respective APs list responsive to the respective average AP freshness parameter being lower than the AP freshness threshold.

* * * * *